United States Patent
Diankov et al.

(10) Patent No.: US 10,766,141 B1
(45) Date of Patent: Sep. 8, 2020

(54) ROBOTIC SYSTEM WITH A COORDINATED TRANSFER MECHANISM

(71) Applicant: MUJIN, Inc., Tokyo (JP)

(72) Inventors: Rosen Nikolaev Diankov, Tokyo (JP);
Shintaro Matsuoka, Tokyo (JP);
Yoshiki Kanemoto, Tokyo (JP);
Hironori Mizoguchi, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/824,673

(22) Filed: Mar. 19, 2020

Related U.S. Application Data

(60) Provisional application No. 62/845,792, filed on May 9, 2019.

(51) Int. Cl.
| | | |
|---|---|---|
| *G06F 17/00* | (2019.01) | |
| *B25J 9/16* | (2006.01) | |
| *B65G 15/00* | (2006.01) | |
| *B65G 47/90* | (2006.01) | |
| *B65G 67/00* | (2006.01) | |
| *B25J 19/02* | (2006.01) | |
| *B65G 47/76* | (2006.01) | |

(52) U.S. Cl.
CPC .......... *B25J 9/1682* (2013.01); *B25J 9/1664* (2013.01); *B25J 9/1687* (2013.01); *B25J 9/1697* (2013.01); *B25J 19/023* (2013.01); *B65G 15/00* (2013.01); *B65G 47/76* (2013.01); *B65G 47/90* (2013.01); *B65G 67/00* (2013.01); *B65G 2203/041* (2013.01); *B65G 2205/00* (2013.01)

(58) Field of Classification Search
CPC ...... B25J 9/1682; B25J 9/1664; B25J 9/1687; B25J 9/1697; B25J 19/023; B65G 15/00; B65G 47/76; B65G 47/90; B65G 67/00; B65G 2203/041; B65G 2205/00
USPC .......................................................... 700/245
See application file for complete search history.

(56) References Cited

U.S. PATENT DOCUMENTS

| | | | | |
|---|---|---|---|---|
| 9,002,507 | B2 * | 4/2015 | Mattern ................. | B25J 9/1697 700/228 |
| 9,089,969 | B1 * | 7/2015 | Theobald ............... | B25J 9/1687 |
| 9,193,070 | B2 * | 11/2015 | Kanemoto ............ | B25J 9/1666 |
| 9,486,921 | B1 * | 11/2016 | Straszheim ........... | B25J 9/1687 |
| 9,492,926 | B2 * | 11/2016 | Mattern ................. | B25J 9/1612 |
| 9,682,481 | B2 * | 6/2017 | Lutz ...................... | B25J 9/1697 |
| 9,776,326 | B2 * | 10/2017 | Zevenbergen ......... | B25J 5/00 |
| 10,227,176 | B2 * | 3/2019 | Sugahara ............. | B65G 1/0492 |
| 10,399,227 | B1 * | 9/2019 | Islam .................... | B25J 9/1692 |
| 10,456,915 | B1 * | 10/2019 | Diankov ................ | B25J 9/1664 |
| 10,576,636 | B1 * | 3/2020 | Islam .................... | B25J 9/1664 |
| 10,618,172 | B1 * | 4/2020 | Diankov ............... | B25J 9/1697 |

* cited by examiner

*Primary Examiner* — Ronnie M Mancho
(74) *Attorney, Agent, or Firm* — Perkins Coie LLP

(57) ABSTRACT

The present disclosure relates to operation of a robotic system to transfer an object from a source to a destination. The robotic system may implement one or more motion plans or portions thereof to operate a picking robot to grip and lift the object and place a transfer tray under the lifted object. The robotic system may further implement the one or more motion plans or portions thereof to place the object on the transfer tray and laterally displace the transfer tray and the object thereon toward the destination. The robotic system may operate a placement mechanism to transfer the object from the transfer tray to the destination.

20 Claims, 18 Drawing Sheets

US 10,766,141 B1

ROBOTIC SYSTEM WITH A COORDINATED TRANSFER MECHANISM

CROSS-REFERENCE TO RELATED APPLICATION(S)

This application claims the benefit of U.S. Provisional Patent Application Ser. No. 62/845,792, filed May 9, 2019, which is incorporated by reference herein in its entirety.

TECHNICAL FIELD

The present technology is directed generally to robotic systems and, more specifically, to systems, processes, and techniques for coordinating operations of multiple units.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations and/or interactions between robots.

DETAILED DESCRIPTION

Figure 1:
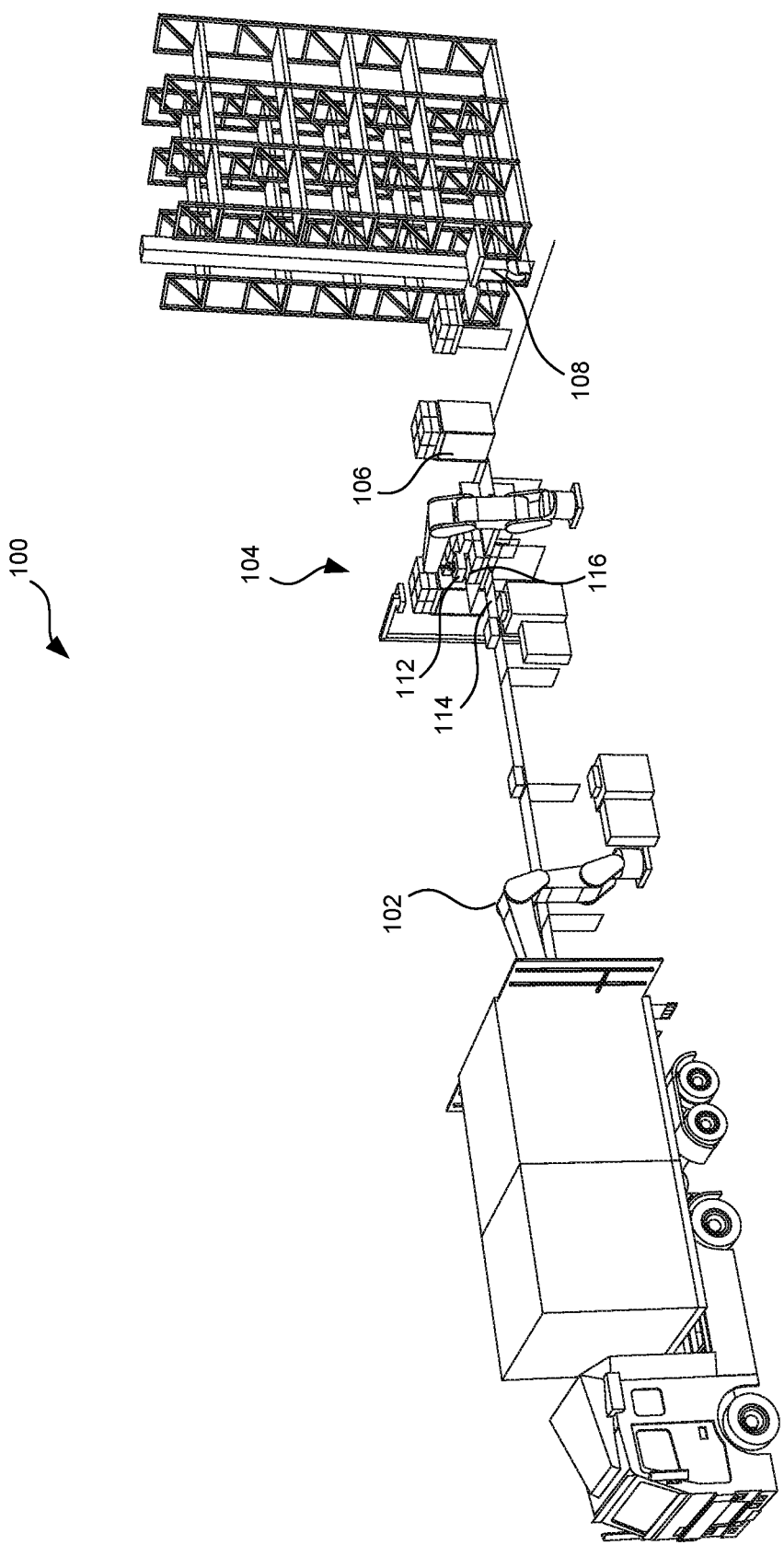
FIG. 1 is an illustration of an example environment in which a robotic system with a coordinated transfer mechanism may operate.

Systems and methods for a robotic system with a coordinated transfer mechanism are described herein. The robotic system (e.g., an integrated system of devices that each execute one or more designated tasks) configured in accordance with some embodiments autonomously executes integrated tasks by coordinating operations of multiple units (e.g., robots). In some embodiments, an integrated task can include transferring object from one location to another. For example, in response to a shipping order that includes a specific set of items/objects, the robotic system can pick the ordered items from one or more sources (e.g., containers) and place them into a destination (e.g., a shipping container).

As described in detail below, in some embodiments, the robotic system can include/operate a picking robot that picks the objects from the source and packs them onto the destination. In some embodiments, the robotic system can include/operate a picking robot to pick the objects and place them on a transfer tray configured to laterally transfer the objects between the source and the destination. For example, the transfer tray can be adjacent to the source and/or the destination and/or laterally transfer the objects from over/adjacent to the source to over/adjacent to the destination. The robotic system can include a stopper configured to contact the objects on the source while the tray continues moving, thereby causing the objects to slide off the tray and drop onto the destination. The stoppers can be configured to contact the objects while the tray moves away from or towards the source. In some embodiments, the robotic system can include a packing robot that picks the objects from the transfer tray and places them onto the destination.

Further, in some embodiments, the transfer robots can include an end-effector (e.g., a gripper) that has a set of suction cups. The suction cups can be operated and/or activated individually to grip objects having various sizes, shapes, contours, and/or surface characteristics. In some embodiments, the transfer tray can include a belt conveyor transfer tray, a slotted transfer tray, and/or a perforated surface transfer tray. In some embodiments, the robotic system can include/operate one or more flexible gripper that is attached to a link via a joint. The flexible gripper can further include a locking mechanism and/or an actuator. In some embodiments, the robotic system can include a position adjustment mechanism configured to adjust position/ pose of objects before picking and/or after packing operations. Details are described below.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is an illustration of an example environment in which a robotic system 100 with a coordinated transfer mechanism may operate. The robotic system 100 can include and/or communicate with one or more units (e.g., robots) configured to execute one or more tasks. Aspects of the coordinated transfer mechanism can be practiced or implemented by the various units.

For the example illustrated in FIG. 1, the robotic system 100 can include an unloading unit 102, a transfer unit 104 (e.g., a palletizing robot and/or a piece-picking robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. In some embodiments, the task can include placing the objects on a target location (e.g., on top of a pallet and/or inside a bin/cage/box/case). As described in detail below, the robotic system 100 can derive plans (e.g., placement locations/orientations, sequence for transferring the objects, and/or corresponding motion plans) for placing and/or stacking the objects. Each of the units can be configured to execute a sequence of actions (e.g., operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc. corresponding to the executing task) from a start/source location 114 to a task/destination location 116. For example, the unloading unit 102 (e.g., a devanning robot) can be configured to transfer the target object 112 from a location in a carrier (e.g., a truck) to a location on a conveyor. Also, the transfer unit 104 can be configured to transfer the target object 112 from one location (e.g., the conveyor, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 (e.g., a conveyor, an automated guided vehicle (AGV), a shelf-transport robot, etc.) can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a packaging and/or shipping center; however, it is understood that the robotic system 100 can be configured to execute tasks in other environments/for other purposes, such as for manufacturing, assembly, storage/stocking, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping/casing the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., a gripper) configured to execute one or more tasks (e.g., gripping, spinning, welding, etc.) depending on the use/operation of the robotic system 100. The robotic system 100 can include actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process digital images and/or point clouds to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside of a bin or on a pallet) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
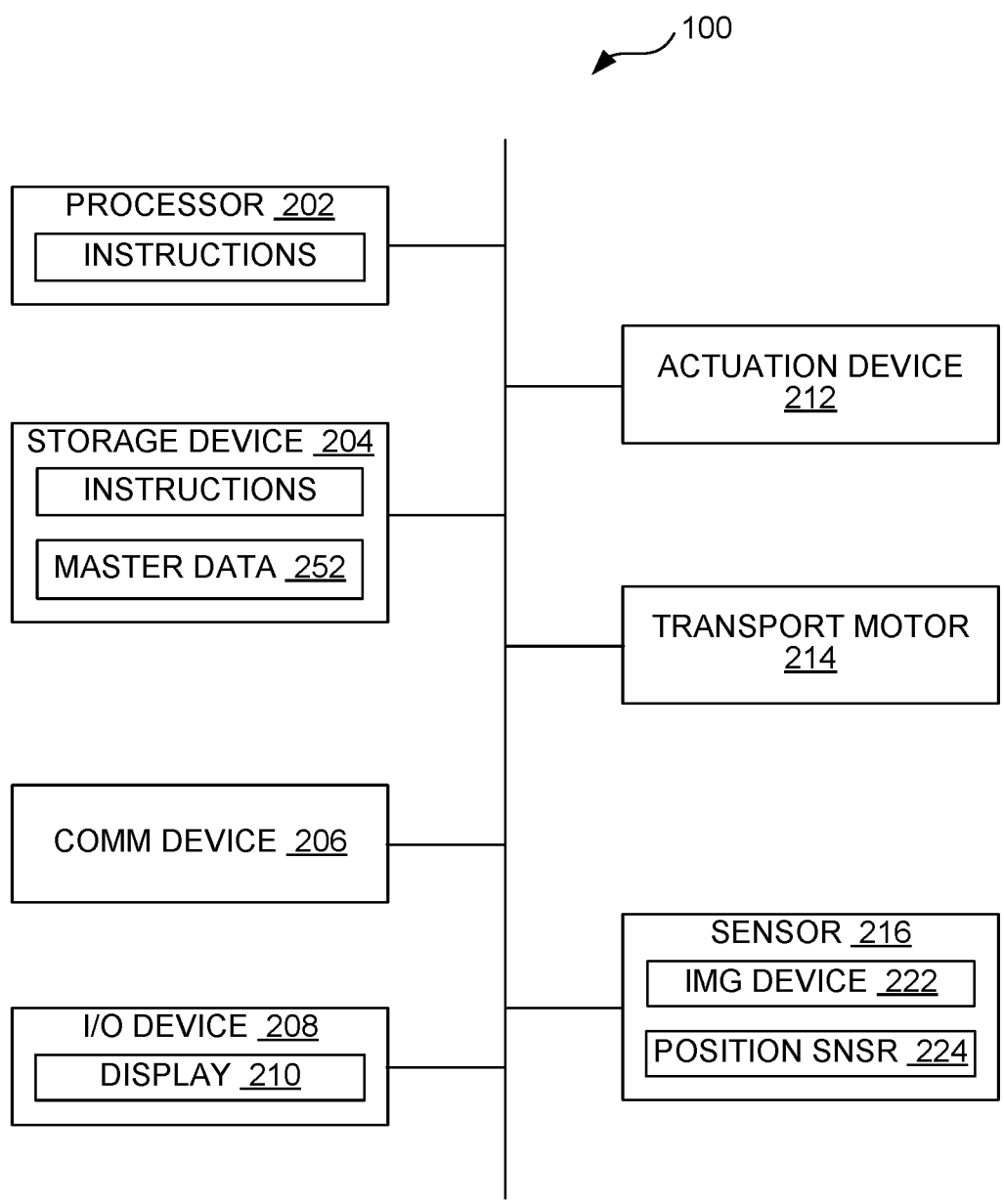
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (Wi-Fi)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze image data of a designated area (e.g., a pickup location, such as inside the truck or on the conveyor belt) to identify the target object 112 and the start location 114 thereof. Similarly, the robotic system 100 can capture and analyze image data of another designated area (e.g., a drop location for placing objects on the conveyor, a location for placing objects inside the container, or a location on the pallet for stacking purposes) to identify the task location 116. For example, the imaging devices 222 can include one or more cameras configured to generate image data of the pickup area and/or one or more cameras configured to generate image data of the task area (e.g., drop area). Based on the image data, as described below, the robotic system 100 can determine the start location 114, the task location 116, the associated pose, the packing/placement location, the motion plan, and/or other processing results.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

First Example Transfer Environment

Figure 3:
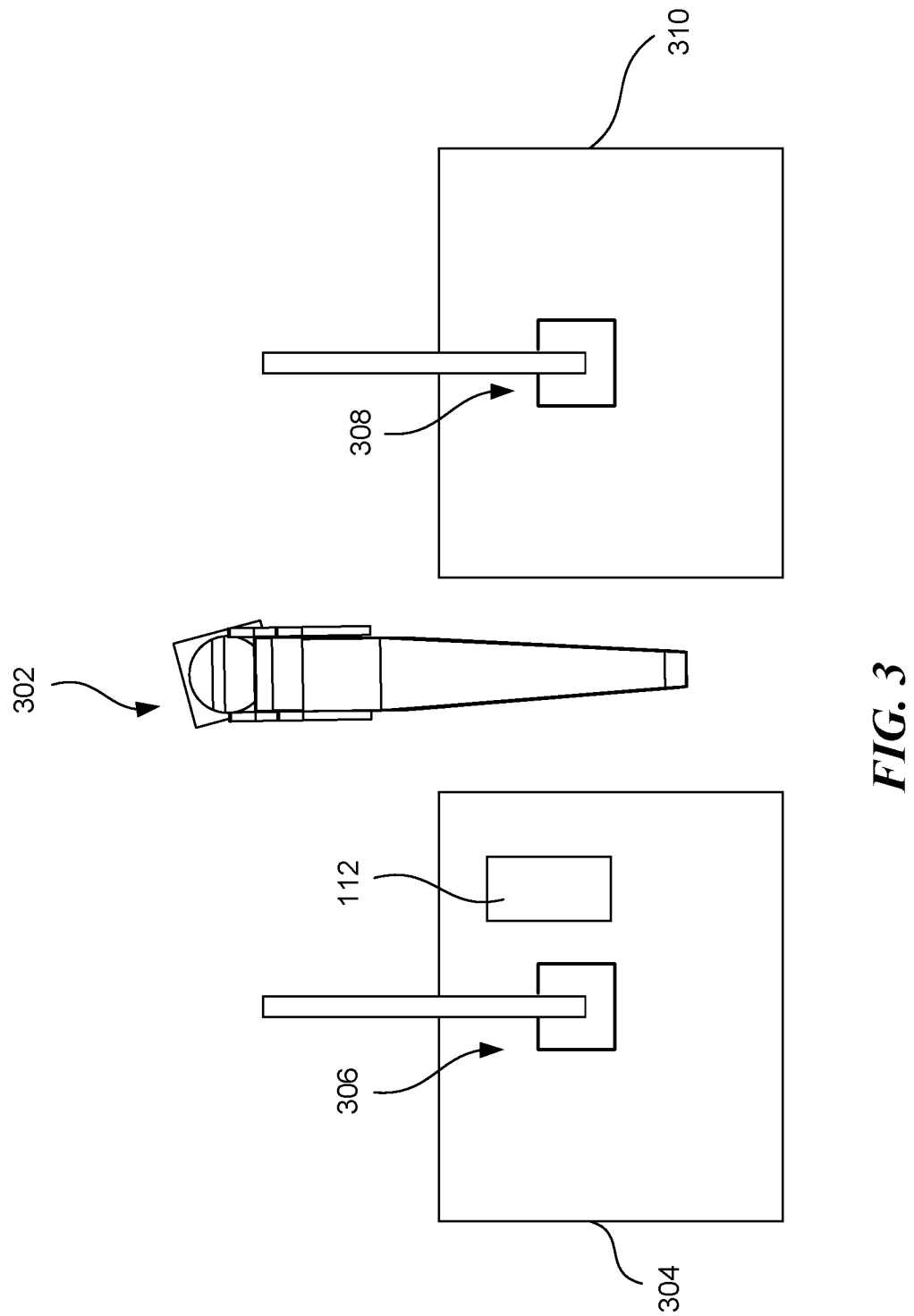
FIG. 3 is a top view illustrating a first example transfer environment in accordance with one or more embodiments of the present technology.

FIG. 3 is a top view illustrating a first example transfer environment in accordance with one or more embodiments of the present technology. The transfer environment (e.g., a portion of the environment shown in FIG. 1) can include a picking robot 302 (e.g., an instance of the transfer unit 104 of FIG. 1), a source sensor 306, and/or a destination sensor 308. The source sensor 306 can include an instance of the sensors 216 of FIG. 2 (e.g., a two-dimensional (2D) camera, a three-dimensional (3D) camera, and/or a depth sensor) configured to sense/depict the start location 114 of FIG. 1. Similarly, the destination sensor 308 can include an instance of the sensors 216 (e.g., a 2D camera, a 3D camera, and/or a depth sensor) configured to sense/depict the task location 116 of FIG. 1.

The robotic system 100 can operate (via, e.g., the processor(s) 202 of FIG. 2) the picking robot 302 to pick the target object 112 from a source container 304 (e.g., a pallet, a bin, a cart, a box, a case, etc.), transfer the target object 112 across space, and place the target object 112 at a destination container 310 (e.g., a pallet, a bin, a cart, a box, a case, etc.). For example, the robotic system 100 can derive and/or obtain a motion plan (e.g., a sequence of commands and/or settings for the actuation devices 212 of FIG. 2 and/or the transport motor 214 of FIG. 2) configured to operate the picking robot 302 and manipulate/transfer the target object 112 along a corresponding path. The robotic system 100 can implement the motion plan, such as by communicating the sequence of commands and/or settings to the picking robot 302 and/or by executing the sequence of commands and/or settings via the picking robot 302. In executing the motion plan, the picking robot 302 can place an end-effector (e.g., a gripper) thereof at a designated location about the target object 112, engage/contact the target object 112 with the end-effector, and grip the target object 112 with the end-effector. Once gripped, the picking robot 302 can lift the target object 112 and/or transfer the target object 112 laterally (e.g., from the source container 304 toward the destination container 310). The picking robot 302 can lower the target object 112 on a designated location in the destination container 310 and release the target object 112 to complete a transfer task for the target object 112 according to the motion plan.

The source sensor 306 and/or the destination sensor 308 can be used to determine real-time information regarding the source container 304, destination container 310, and/or contents (e.g., object) therein. For example, the source sensor 306 and/or the destination sensor 308 can generate real-time image data (e.g., 2D/3D images, depth maps, point clouds, etc.) of the start location 114 and/or the task location 116. The robotic system 100 can process the image data to determine locations and/or edges of objects and/or identify objects. Accordingly, in some embodiments, the robotic system 100 can use the image data to derive/generate the motion plan, such as by identifying the target object, deriving approach location/path to grip the target object, and/or deriving approach location/path to place the target object 112. In some embodiments, the robotic system 100 can use the image data to track a progress during execution of the motion plan. For example, the robotic system 100 can process the image data to locate the end-effector and/or the target object 112, detect collisions, detect object loss (e.g., losing grip and dropping the target object 112 during transfer), and/or other events/physical attributes.

For illustrative purposes, the source container 304 and the destination container 310 are described as open-top containers having at least a pair of opposing vertical walls. However, it is understood that the source container 304 and the destination container 310 can include various other structures as described above. For example, the source container 304 and/or the destination container 310 can include a pallet that doesn't have any vertical walls extending above a placement surface. Also, the source container 304 and/or the destination container 310 can include an open-top box having three or more vertical walls. Further, the source container 304 and/or the destination container 310 can be implemented via a car track, a conveyor, a cart, and/or other transport container.

First Example Transfer States

Figure 4A:
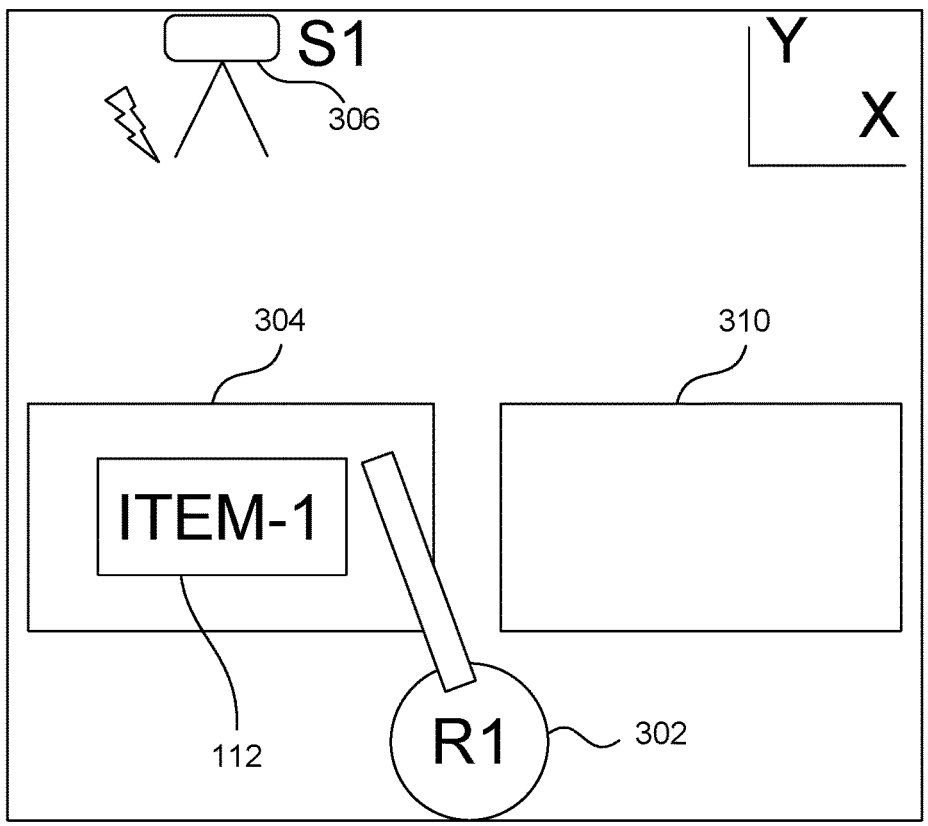
FIGS. 4A-4D are top views illustrating a processing sequence for the first example transfer environment in accordance with one or more embodiments of the present technology.

FIGS. 4A-4D are top views illustrating a processing sequence for the first example transfer environment in accordance with one or more embodiments of the present technology. FIGS. 4A-4D illustrate various states of the picking robot and/or the target object during the processing sequence. As illustrated in FIG. 4A, the robotic system 100 can control the source sensor 306 to generate/obtain an image data depicting the source container 304 and object(s) therein. Based on the image data, the robotic system 100 can process the image data to identify the target object 112 and derive a motion plan to pick up, transfer and/or place the target object 112. According to the motion plan, the robotic system 100 can place the end-effector (by, e.g., operating the picking robot 302 to laterally/vertically displace the end-effector) about or over the target object 112 and pick (by, e.g., gripping with the end-effector and/or lifting) the target object 112.

Figure 4B:
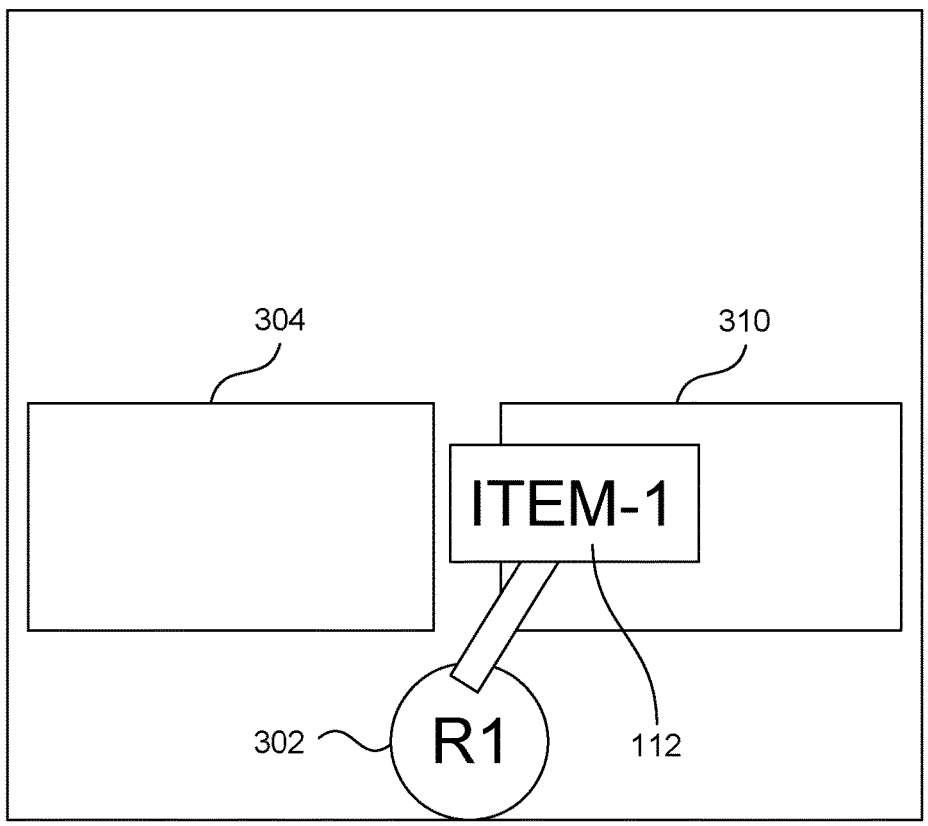

As illustrated in FIG. 4B, the robotic system 100 can control the picking robot 302 to transfer the target object 112 across space (e.g., laterally and/or vertically) and move toward the destination container 310 according to the motion plan. Once the target object 112 is within a threshold distance from and/or over a derived location (e.g., a placement location), the picking robot 302 can place (by, e.g., lowering and/or releasing from the end-effector) the target object 112. In some embodiments, the robotic system 100 can operate (according to, e.g., a portion of the motion plan, such as a source reloading portion) one or more other units (e.g., an AGV, a shelf-transport robot, etc.) to replace the initial source container 304 with a new source container at the start location 114 while the picking robot 302 transfers and/or places the target object 112. In other embodiments, the source container 304 can include multiple objects which can be selected as the new target object 402.

Figure 4C:
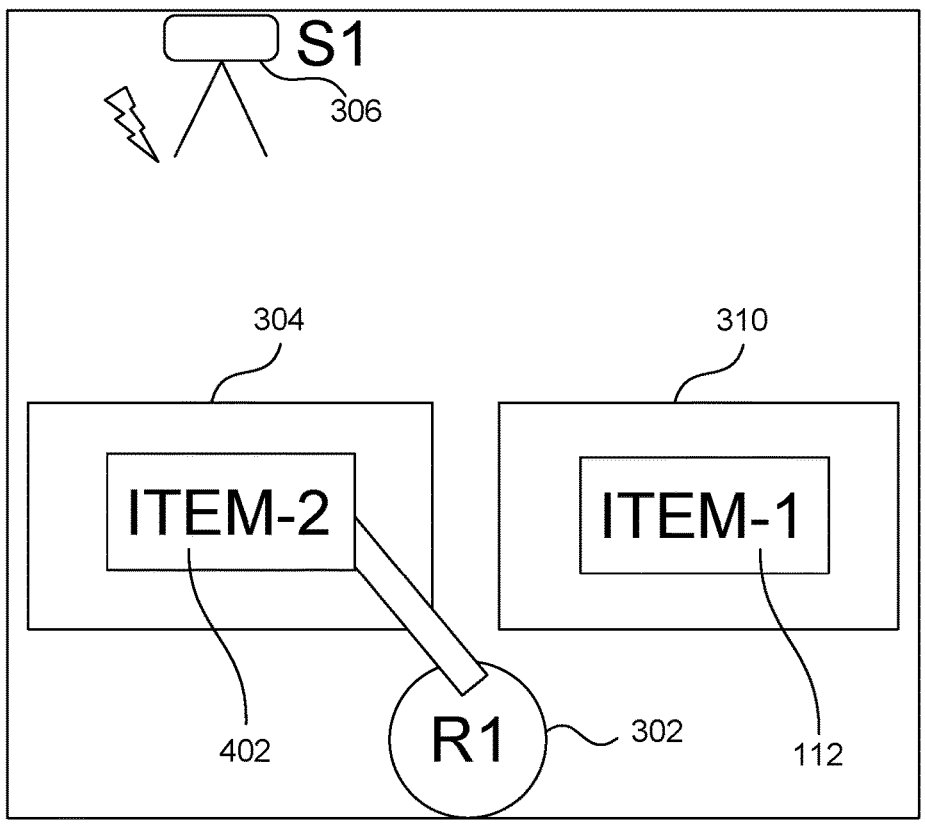

As illustrated in FIG. 4C, the robotic system 100 can control the source sensor 306 to generate a new image data. The robotic system 100 can generate the image data similarly as described above to depict the source container 304. Accordingly, the robotic system 100 can process the new image data and derive a new motion plan as described above. The robotic system 100 can operate the picking robot 302 to pick a new target object 402 in the source container 304 at the start location 114.

Figure 4D:
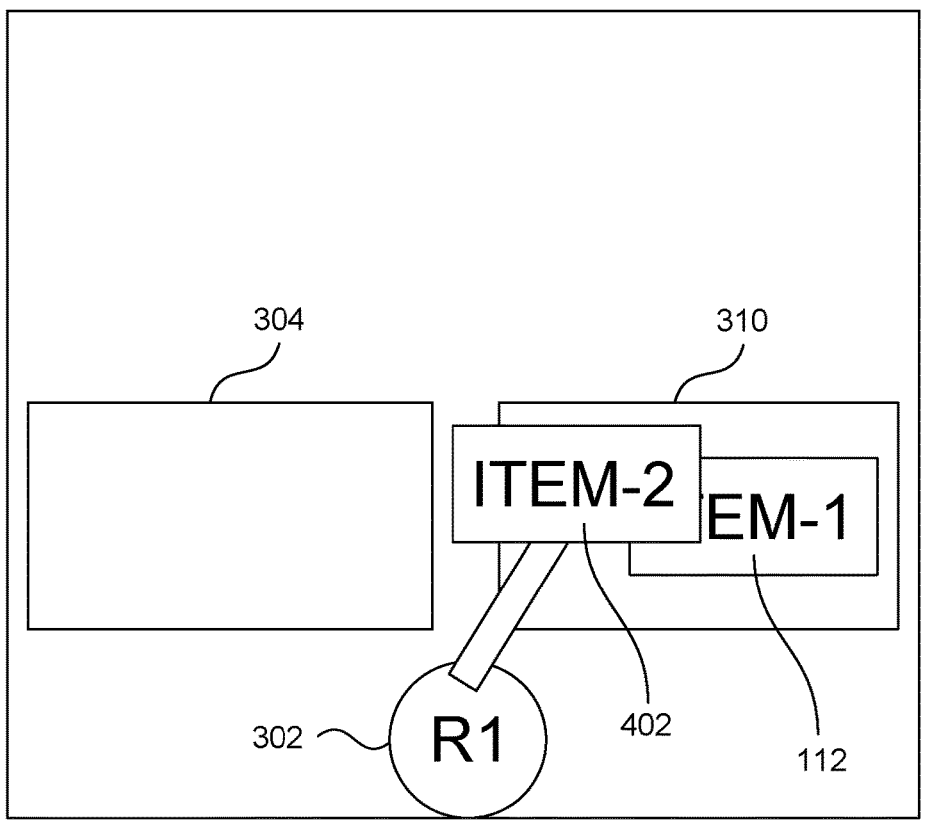

As illustrated in FIG. 4D, the robotic system 100 can control the picking robot 302 to transfer the new target object 402 across space and move toward the destination container 310 according to the new motion plan. The robotic system 100 can place the new target object 402 at a designated location, which can be adjacent to and/or over the previously placed/targeted object 112. The above-described example states can be repeated according to the processing sequence to pack the destination container 310 (e.g., a shipping container or a box) with targeted objects, such as for fulfilling a shipping order.

Second Example Transfer Environment

Figure 5A:
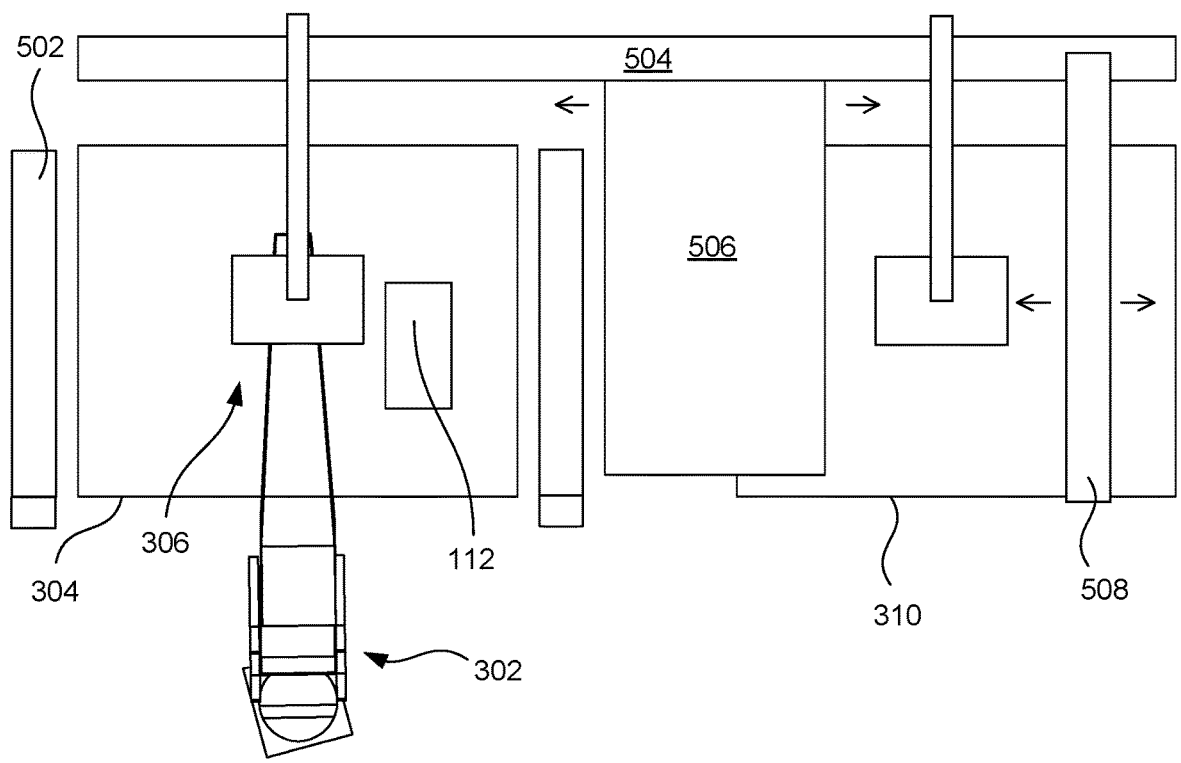
FIG. 5A is a top view illustrating a second example transfer environment.
Figure 5B:
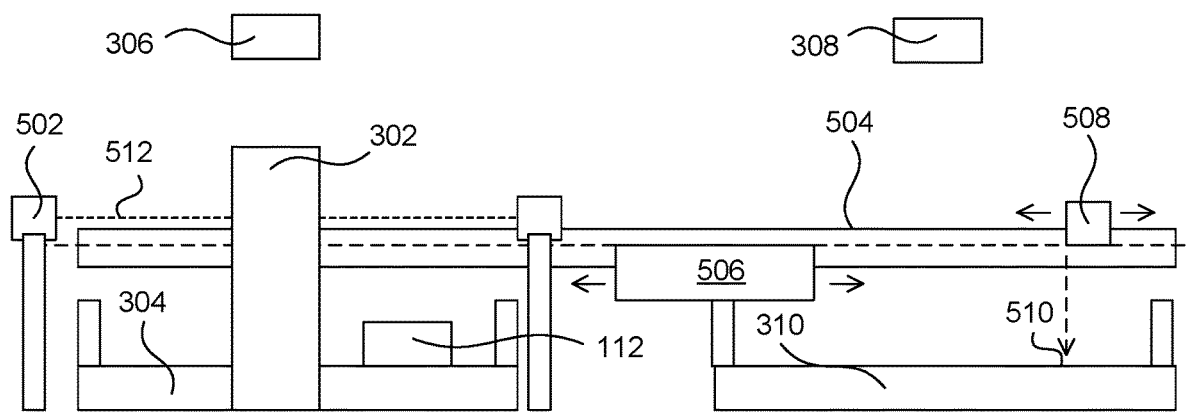
FIG. 5B is a profile view illustrating the second example transfer environment, both in accordance with one or more embodiments of the present technology.

FIG. 5A is a top view illustrating a second example transfer environment, and FIG. 5B is a profile view illustrating the second example transfer environment, both in accordance with one or more embodiments of the present technology. Referring to FIGS. 5A and 5B together, the transfer environment (e.g., a portion of the environment shown in FIG. 1) can include a picking robot 302 (e.g., an instance of the transfer unit 104 of FIG. 1), a source sensor 306, a destination sensor 308, a source container 304, and/or a destination container 310 similarly as the environment illustrated in FIG. 3.

The environment can further include a transfer tray 506 configured to laterally transfer the target object 112. The transfer tray 506 can be operably coupled to a lateral transfer mechanism. The lateral transfer mechanism can include a guiding rail 504 and be configured to move the transfer tray 506 laterally between the source container 304 and the destination container 310. In some embodiments, the transfer tray 506 can move along a horizontal line/plane via the guiding rail 504 and one or more transport motors (not shown). The horizontal line/plane of movement for the transfer tray 506 can be located vertically above the source container 304 and the destination container 310, below the source/destination sensors 306 and 308, and/or below a top movement range of the picking robot 302. In some embodiments, the transfer tray 506 may include one or more sensor devices (not shown). The sensor devices can be integrated or attached to the transfer tray 506 to provide object information about the target object 112 currently on the transfer tray 506. For example, the sensor devices can be object identifier scanners, such as a radio-frequency identification (RFID) scanner to read RFID tags of the target object 112, or sensors capable of determining physical properties of the target object 112 such as weight or mass.

As described above, the robotic system 100 of FIG. 1 can obtain and process image data to analyze real-time conditions of the source container 304 and/or the destination container 310. Further, the robotic system 100 can process the image data to identify the target object 112 and to derive a motion plan for transferring the target object 112 from the source container 304 to a derived location in/on the destination container 310. Moreover, the robotic system 100 can implement and/or execute the motion plan as described above.

In executing the motion plan, the robotic system 100 can control the picking robot 302 to pick the target object 112. The robotic system 100 can derive the motion plan to move the transfer tray 506 toward the source container 304 and/or below the target object 112 once the target object 112 is lifted above a predetermined height. In some embodiments, the timing for moving the transfer tray 506 can be based on additional image data from the source sensor 306 and/or a tracked height of the end-effector.

In some embodiments, the robotic system 100 can move the transfer tray 506 and/or operate the picking robot 302 according to outputs from one or more area sensors 502. The robotic system 100 can include the area sensors 502 that are configured to detect crossing events. Some examples of the area sensors 502 can include transmitters that transmit signals (e.g., optical signals, infrared signals, laser, etc.) along a crossing threshold 512. The transmitters can further include signal detectors that detect the transmitted signals. The area sensors 502 can determine that an object entered/crossed the crossing threshold 512 based on detecting a disruption (e.g., discontinuity) in receiving the transmitted signal. Further, the area sensors 502 can determine that the object exited/cleared the crossing threshold 512 based on detecting the transmitted signals after the disruption. Accordingly, the robotic system 100 can include the area sensors 502 configured with the crossing threshold 512 above and/or coincident with an upper portion (e.g., a top surface) of the transfer tray 506. Thus, when the end-effector and/or the target object 112 crosses the crossing threshold 512 and then subsequently exits the crossing threshold 512 during the picking operation, the area sensors 502 can generate an exit event. The robotic system 100 can use the exit event as a trigger to laterally move the transfer tray 506 until it is within a threshold distance from, under, and/or overlapping the target object 112.

Once the transfer tray 506 is in position relative to the target object 112 (e.g., under the target object 112 and/or at a predetermined stop location), the robotic system 100 can place the target object 112 on the transfer tray 506. For example, the robotic system 100 can operate the picking robot 302 to lower the target object 112 and/or release the target object 112 onto the transfer tray 506. In some embodiments, the robotic system 100 can include the area sensors 502 configured with the crossing threshold 512 just above vertical edges/walls of the source container 304 and/or the upper surface of the transfer tray 506, thereby reducing a vertical distance between the target object and the transfer tray 506.

The robotic system 100 can operate the transfer tray 506 to displace the target object 112 along lateral (e.g., horizontal) directions. Accordingly, the picking robot 302 can be used primarily for vertically displacing or lifting the target object 112. Using the transfer tray 506 to laterally displace the target object 112, thereby reducing horizontal movement of the target object 112 via the picking robot 302, increases throughput for the robotic system 100. Using the picking robot 302 to primarily lift the target object 112 reduces total grip time, horizontal forces, and/or collisions that contribute to piece loss (e.g., due to failed grip). Accordingly, the robotic system 100 can reduce the piece loss rate. Further, even if grip fails, the target object 112 would drop into the source container 304 according to the above-described configuration. Thus, even dropped pieces can be manipulated again (via, e.g., re-imaging the source container 304 and re-deriving motion plans) without assistance from human operators. Moreover, since the target object 112 is no longer gripped during lateral transfer, horizontal transfer speed can be increased using the transfer tray 506 in comparison to horizontally transferring the target object 112 via the picking robot 302. Thus, the robotic system 100 can reduce the time necessary to transfer each object using the transfer tray 506.

For placing the target object 112 at/in the destination container 310, the robotic system 100 can include a stopper 508 configured to horizontally displace the target object 112 from the top surface of the transfer tray 506. In some embodiments, the stopper 508 can be located over the destination container 310 at a height that is above the transfer tray 506. The stopper 508 can be configured to move horizontally, such as along the guiding rail 504 and/or via another mechanism. To place/drop the target object 112, the robotic system 100 can move the stopper 508 along a lateral direction until an edge/surface of the stopper 508 is directly above a drop location 510. Once the target object 112 is placed on the transfer tray 506, the robotic system 100 can move the transfer tray 506 toward and past the drop location 510. With the stopper 508 (e.g., a bottom portion thereof) vertically located just above the top surface of the transfer tray 506, the target object 112 can be held in place by the stopper 508 while the transfer tray 506 continues moving past the stopper 508. Accordingly, the target object 112 can slide off the transfer tray 506 and drop into the destination container 310. Thus, the robotic system 100 can provide increased success rate for the tasks, allow for simpler/smaller gripper designs, and reduce probability of double pick events.

Second Example Transfer States

Figure 6A:
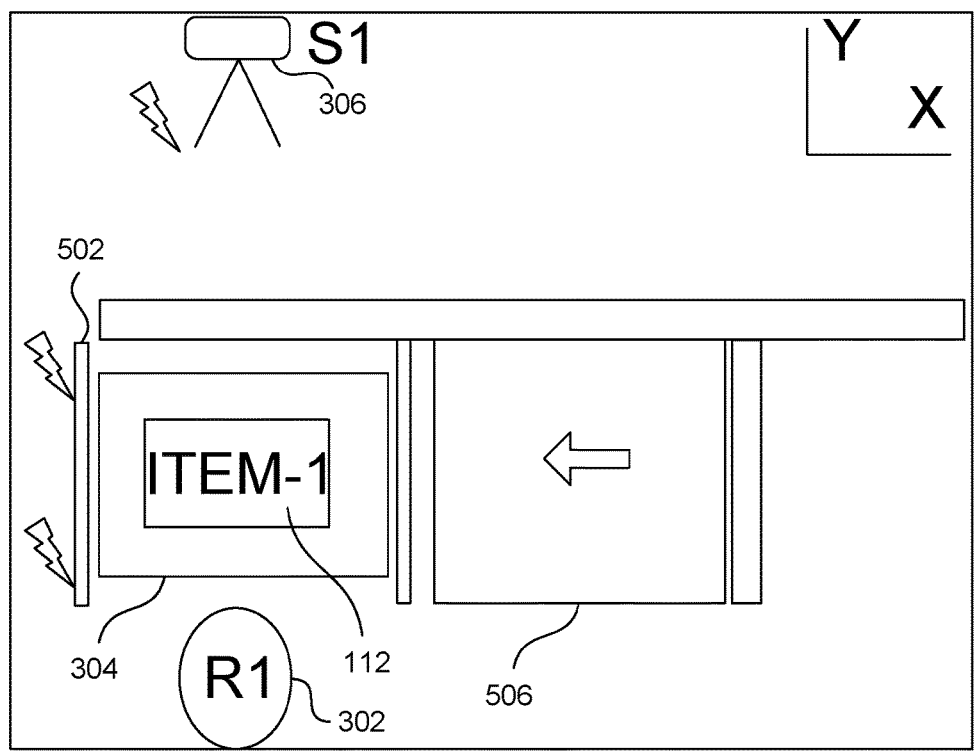
FIGS. 6A-6D are top views illustrating a processing sequence for the second example transfer environment in accordance with one or more embodiments of the present technology.

FIGS. 6A-6D are top views illustrating a processing sequence for the second example transfer environment in accordance with one or more embodiments of the present technology. FIGS. 6A-6D illustrate various states of the robotic system 100 of FIG. 1 and/or the target object 112 during the processing sequence. As illustrated in FIG. 6A, the robotic system 100 can control the source sensor 306 to generate an image data depicting the source container 304 and object(s) therein. Based on the image data, the robotic system 100 can process the image data to identify the target object 112 and derive a motion plan to pick up, transfer and/or place the target object 112. According to the motion plan, the robotic system 100 can operate the picking robot 302 to pick the target object 112 (by, e.g., gripping with the end-effector and/or lifting). Once the target object 112 reaches a predetermined height (e.g., as represented by a triggering event from the area sensors 502), the robotic system 100 can move the transfer tray 506 from a previous location (e.g., over and/or within a predetermined distance from the destination container 310) to over and/or within a predetermined distance from the source container 304.

Figure 6B:
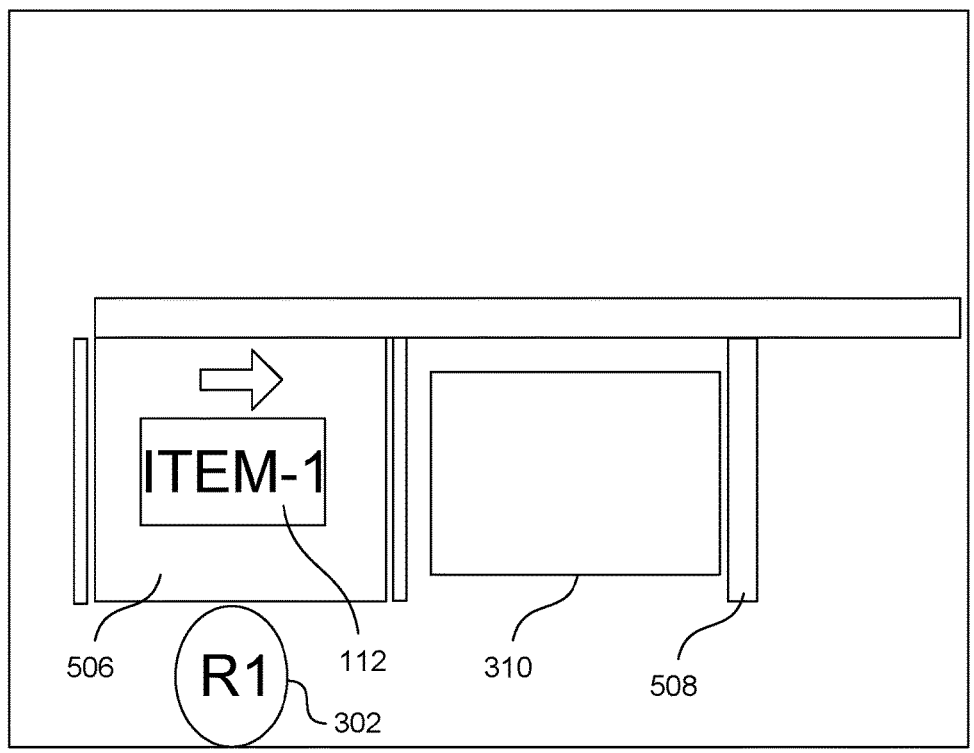

As illustrated in FIG. 6B, the robotic system 100 can control the picking robot 302 to drop and/or place the target object 112 onto the transfer tray 506 below. In some embodiments, the robotic system 100 can adjust a position of the stopper 508 according to a derived drop location 510 for the target object 112. In other embodiments, the stopper 508 can be located at a fixed/static location. The robotic system 100 can move the transfer tray 506 and the target object 112 thereon toward the destination container 310. In some embodiments, the robotic system 100 can replace or refill the source container 304 at the start location 114 after placing the transfer tray 506 below the target object 112 and/or while the transfer tray 506 moves toward the destination container 310. In other embodiments, the source container 304 can include multiple objects which can be selected as the new target object 402.

Figure 6C:
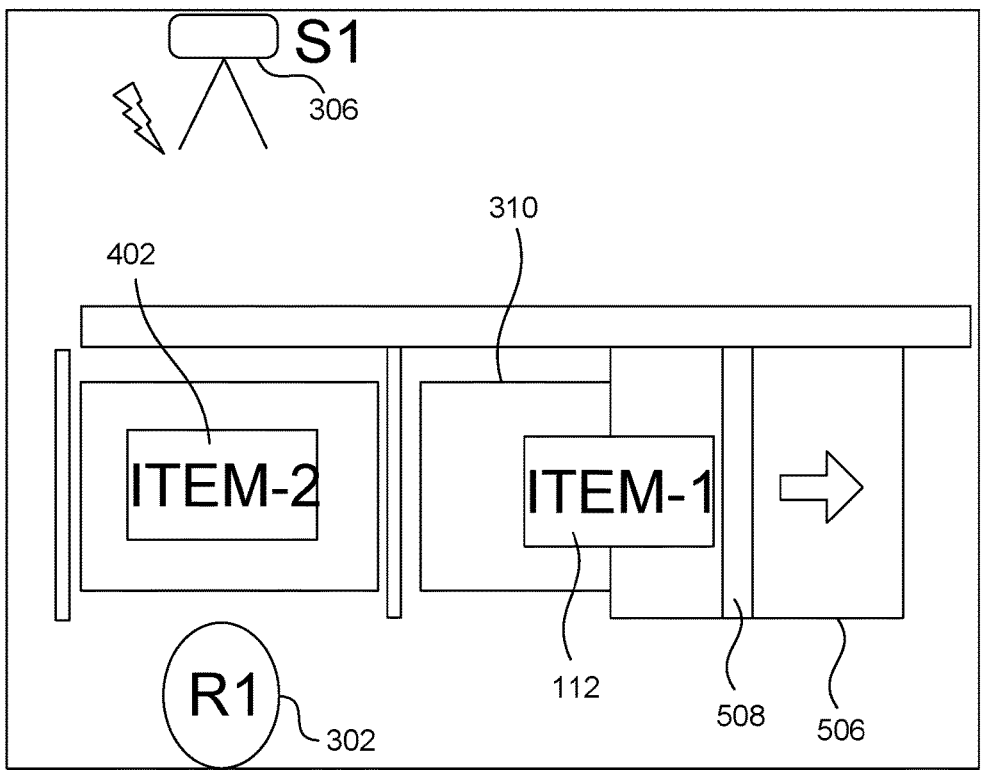

As illustrated in FIG. 6C, the robotic system 100 can move the transfer tray 506 past the stopper 508. Accordingly, the target object 112 can be stopped (e.g., not moving laterally) based on contacting the stopper 508 while the transfer tray 506 continues to move laterally. During the lateral transfer, the robotic system 100 can generate additional image data for the source container 304, generate the corresponding motion plan, and/or pick the next object 402 from the source container 304.

Figure 6D:
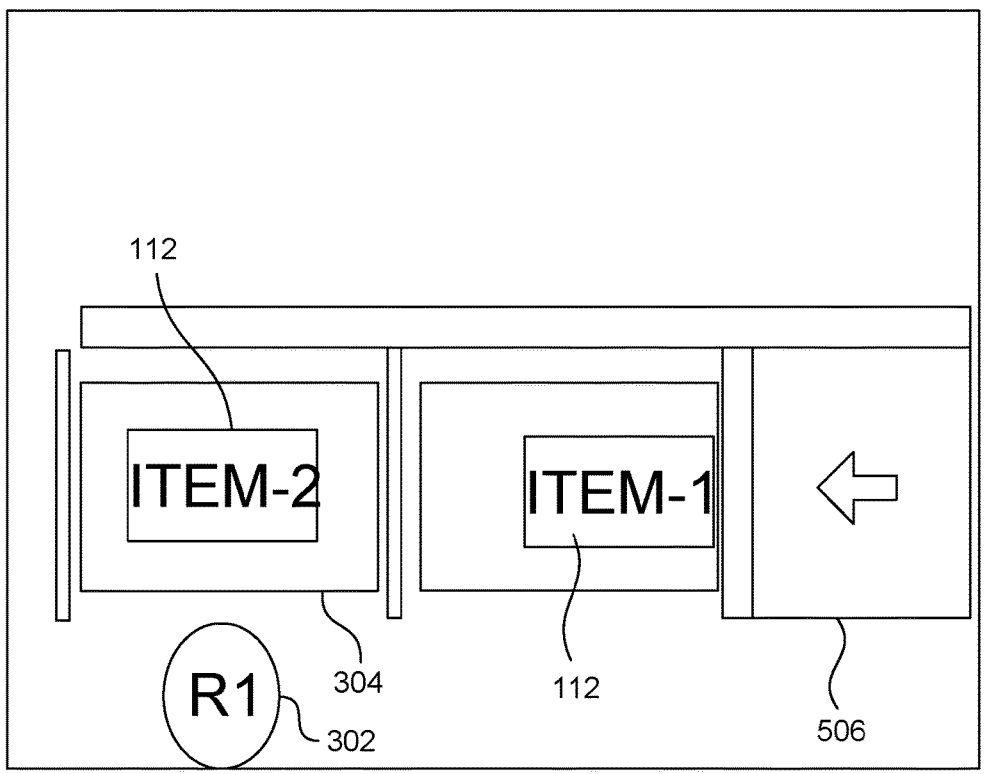

As illustrated in FIG. 6D, the robotic system 100 can continue moving the transfer tray 506 past the stopper 508. As a result, the target object 112 can slide off the transfer tray 506 and drop into the destination container 310. Once the transfer tray 506 reaches a predetermined location (such as for moving a trailing edge of the transfer tray 506 up to or past the stopper 508) and/or once the target object 112 slides off the transfer tray 506, the robotic system 100 can move the transfer tray 506 toward the source container 304. The robotic system 100 can repeat the above described states to pack multiple objects into the destination container 310.

Figure 6E:
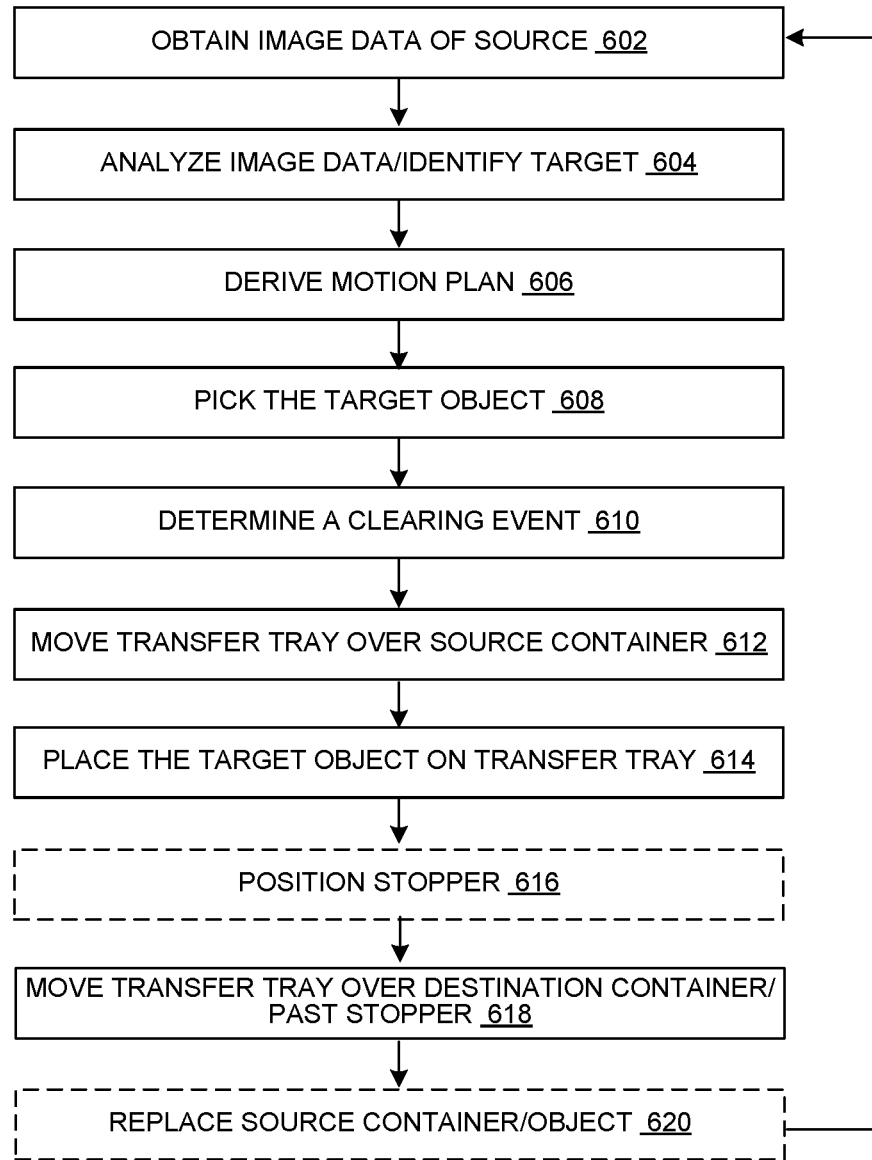
FIG. 6E is a flow diagram of a first example method for operating the robotic system 100 of FIG. 1 in accordance with one or more embodiments of the present disclosure.

FIG. 6E is a flow diagram of a first example method 600 for operating the robotic system 100 of FIG. 1 in accordance with one or more embodiments of the present disclosure. The example flow diagram can represent processes and/or maneuvers executed by one or more units in the second example transfer environment. Accordingly, the example flow diagram, or a portion thereof, can correspond to a motion plan for executing a task to transfer the target object from the source container to the destination container.

At block 602, the robotic system 100 can obtain via the source sensor image data depicting the source container 304 of FIG. 5A and contents therein (e.g., the target object 112 of FIG. 5A). For example, the robotic system 100 can generate 2D/3D images of the start location 114 of FIG. 1 using the source sensor 306 of FIG. 5A. The image data may be received by the one or more processors 202 of FIG. 2. Accordingly, the robotic system 100 can obtain and process the image data that represents the target object 112 located at the start location 114 (e.g., in the source container 304).

At block 604, the robotic system 100 can analyze the image data to identify the target object 112, an object location, and/or an object pose, such as based on identifying and processing edges within the image data. The robotic system 100 can analyze the edges to detect and identify an object. For example, the robotic system 100 can determine an area bounded by a set of intersecting edges as a surface of an object. The robotic system 100 can also compare one or more portions of an image to images in the master data 252 that represent surfaces of known/registered objects. The robotic system 100 can detect an object (by, e.g., determining that a single or a particular object exists or is at a particular location) when an image of the area and/or dimensions of the area match information in the master data 252. In some embodiments, the robotic system 100 can process a 3D image and identify a surface according to exposed edges and/or exposed corners.

At block 606, the robotic system 100 can use such processing results to derive a motion plan. For example, the robotic system 100 can determine a pickup location, a transfer path for the target object, corresponding maneuvers of the picking robot, and/or associated commands/settings. The robotic system 100 can determine a real-world location for the detected object according to a predetermined process or equation that maps imaged locations to real-world locations. The robotic system 100 can derive the motion plan based on identifying the task location 116 of FIG. 1 (e.g., the destination container 310 or a location therein) and deriving a travel path for the target object 112 between the current real-world location and the task location 116. The robotic system 100 can derive the travel path based on a predetermined set of rules, processes, routines. The robotic system 100 can derive the motion plan based on translating the travel path to a set/sequence of commands/settings and/or conditions for executing such commands/settings for the picking robot 302 of FIG. 5A.

As an illustrative example, the robotic system 100 can derive the motion plan for operating the picking robot 302 and the end-effector thereof to place the end-effector directly adjacent to (e.g., directly above) and contact the target object, grip the target object 112 with the end-effector, and lift the target object 112 to the predetermined height. In some embodiments, the robotic system 100 can derive the motion plan to lift the target object 112 until the exit event is detected by the area sensors 502 as described above. The robotic system 100 can further derive the motion plan to operate the picking robot 302 and/or the transfer tray 506 of FIG. 5A to place the target object 112 on the transfer tray 506 and laterally transfer the target object 112 via the transfer tray 506. For example, the robotic system 100 can derive the motion plan to place the transfer tray 506 within a threshold distance from and/or under the target object 112 based on the target object 112 reaching the predetermined height (e.g., based on detecting the exit event). The robotic system 100 can also derive the motion plan to operate the transfer tray 506 and/or the stopper 508 of FIG. 5A to drop the target object 112 at the task location 116.

The robotic system 100 can implement the motion plan, such as by communicating the motion plan and/or the associated commands/settings from the processors 202 to the picking robot 302 and/or a system for moving the transfer tray 506 and/or the stopper 508. The robotic system 100 can further implement the motion plan by executing the motion plan via the picking robot 302, the transfer tray 506, and/or the stopper 508. Accordingly, at block 608, the robotic system 100 can implement a portion (e.g., a picking portion) of the motion plan and pick (e.g., grip and/or lift) the target object via the picking robot 302. As an initial state, in some embodiments, the transfer tray can be over or within a predetermined distance from the destination container 310.

At block 610, the robotic system 100 can determine a clearing event. The robotic system 100 can determine the clearing event that represents the target object 112 reaching the predetermined height. In some embodiments, the robotic system 100 can determine the clearing event based on tracking a height of the end-effector while implementing the motion plan, such as when the tracked height reaches a height greater than a minimum clearance height plus a known height of the target object 112. The robotic system 100 can also determine the clearing event based on detecting an exit event with the area sensors 502 as described above.

At block 612, the robotic system 100 can implement a portion (e.g., a source transfer portion) of the motion plan using the clearing event as a trigger to move the transfer tray 506 toward the source container 304. Accordingly, for example, the robotic system 100 can place the transfer tray 506 directly under the picked target object 112. At block 614, the robotic system 100 can implement a portion (e.g., a tray placement portion) of the motion plan to place/drop the target object 112 on the transfer tray 506, such as by lowering the target object 112 and/or releasing the target object 112 from the end-effector.

In some embodiments, as illustrated at block 616, the robotic system 100 can implement a portion (e.g., a stopper placement portion and/or a stopper alignment portion) of the motion plan to position the stopper 508, such as by moving the stopper 508 along a horizontal direction/plane and aligning an edge of the stopper over a drop location. At block 618, the robotic system 100 can implement a portion (e.g., a destination transfer portion) of the motion plan to move the transfer tray 506 toward, past, and/or over the destination container 310 and at least partially past the stopper 508 as described above. Accordingly, the robotic system 100 can operate the components to slide the target object 112 off the transfer tray 506 and drop it into the destination container 310. In some embodiments, as illustrated at block 620, the robotic system 100 can implement a portion of the motion plan to replace the source container 304 and/or reload a new object (e.g., the new target object 402 of FIG. 6C) at the start location 114 for the next task. In other embodiments, the source container 304 can include multiple objects which can be selected as the new target object 402. The operational flow can pass to block 602 and the robotic system 100 can repeat the above-described process to execute the next task for the new object.

Third Example Transfer Environment

Figure 7A:
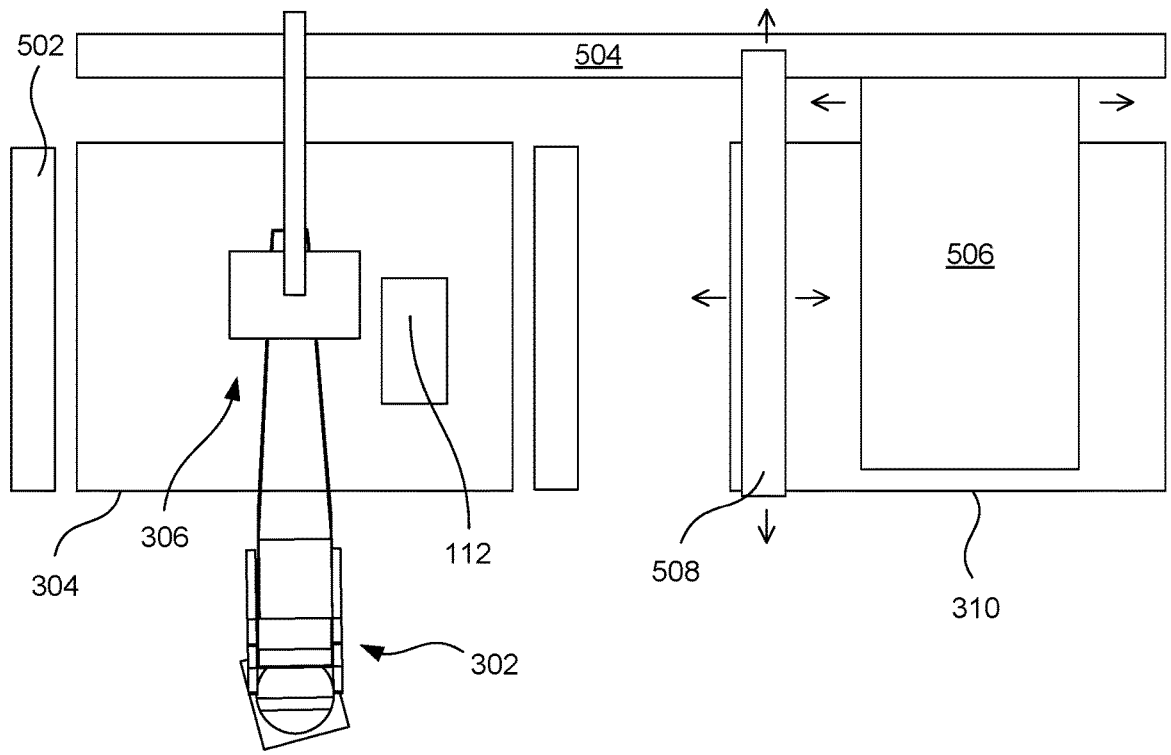
FIG. 7A is a top view illustrating a third example transfer environment.
Figure 7B:
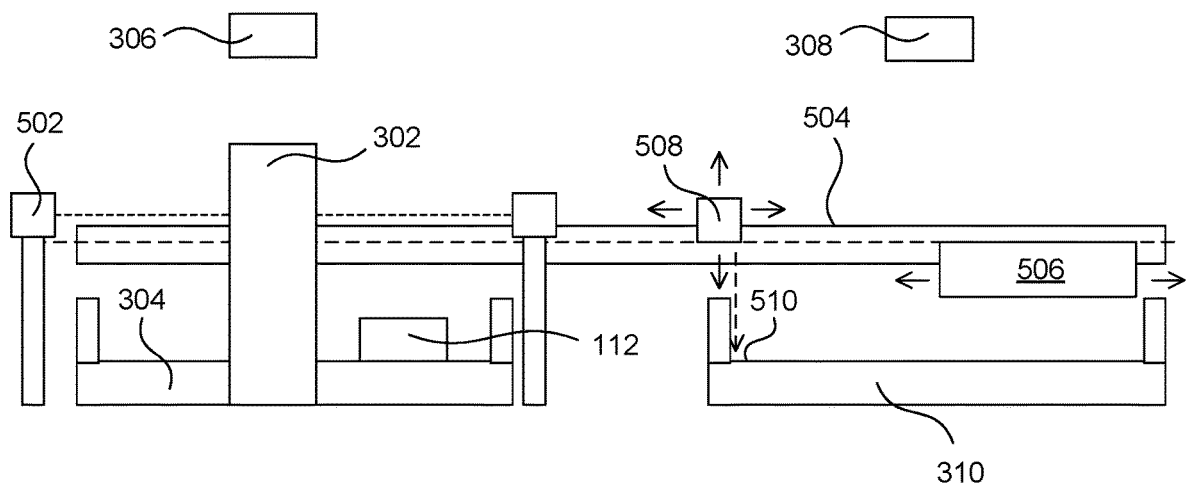
FIG. 7B is a profile view illustrating the third example transfer environment, both in accordance with one or more embodiments of the present technology.

FIG. 7A is a top view illustrating a third example transfer environment, and FIG. 7B is a profile view illustrating the third example transfer environment, both in accordance with one or more embodiments of the present technology. Referring to FIGS. 7A and 7B together, the transfer environment (e.g., a portion of the environment shown in FIG. 1) can be similar to the environment illustrated in FIGS. 5A and 5B. For example, the third example transfer environment can include a picking robot 302 (e.g., an instance of the transfer unit 104 of FIG. 1), a source sensor 306, a destination sensor 308, a source container 304, a destination container 310, a transfer tray 506, a guiding rail 504, a stopper 508, and/or an area sensor 502 as described above.

For the third example transfer environment, the stopper 508 can be located closer to the source container 304 in comparison to the second example transfer environment. Further, the stopper 508 can be configured to have at least an engaged state for contacting the target object 112 and a disengaged state for allowing the target object 112 to pass by. For example, the robotic system 100 can move the stopper 508 along a vertical direction in FIG. 7A and/or up/down as shown in FIG. 7B for the engaged and disengaged states. Accordingly, the robotic system 100 can operate the transfer tray 506 and the stopper 508 such that the stopper 508 contacts/engages the target object 112 on the transfer tray 506 when the tray 506 is moving toward the source container 304. In other words, the robotic system 100 can operate the stopper 508 to be in the disengaged state after the picking robot 302 places the target object 112 on the transfer tray 506. The transfer tray 506 can move toward and/or over the destination container 310 with the stopper 508 in the disengaged state, thereby continuing to carry the target object 112 thereon. Once the transfer tray 506 reaches a predetermined location about the destination container 310, the robotic system 100 can operate the stopper 508 to be in the engaged state. The robotic system 100 can subsequently move the transfer tray 506 toward the source container 304 and past the stopper 508. With the stopper 508 in the engaged state, the stopper 508 can contact the target object 112 such that the target object 112 slides off the transfer tray 506 and drops into the destination container 310. Accordingly, with the stopper 508 located closer to the source container 304 and having engaged/disengaged states, the robotic system 100 can further increase the throughput by reducing the total amount of distance traveled by the transfer tray 506 for each task. Thus, the execution time of each task can be reduced, which leads to the increased throughput. The reduction in distance traveled by the transfer tray 506 can further reduce a horizontal footprint of the robotic system 100. Additionally, the above-described configuration can increase the success rate for completing the tasks, allow for simpler and smaller gripper designs, and reduce probability of double pick events.

Third Example Transfer States

Figure 8A:
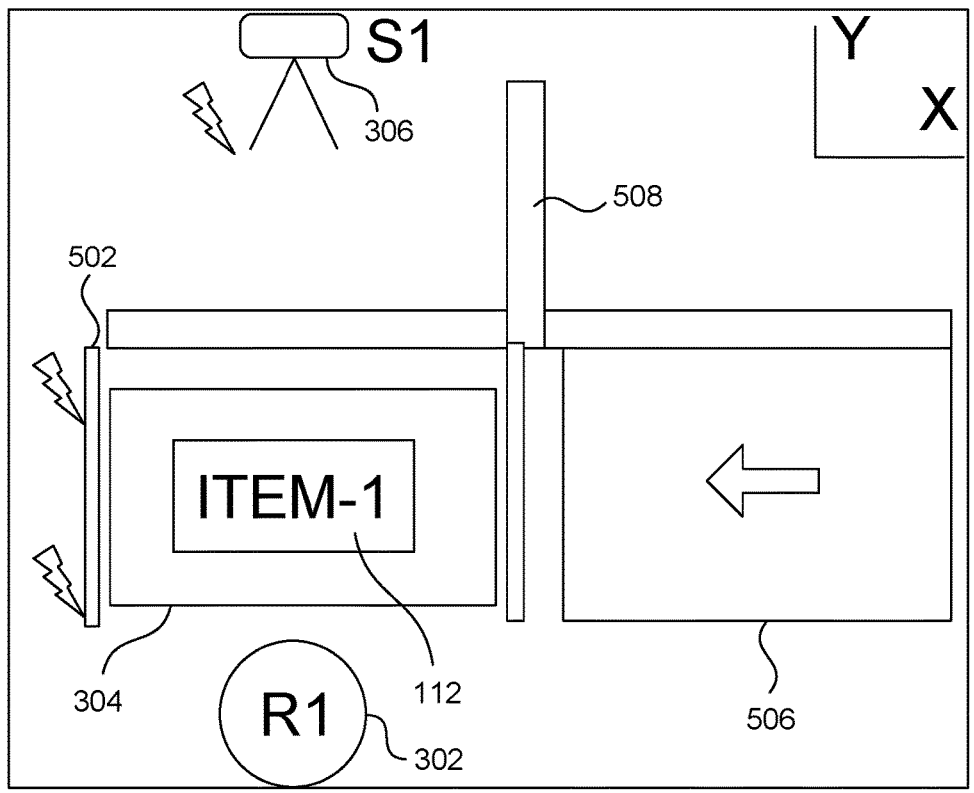
FIGS. 8A-8D are top views illustrating a processing sequence for the third example transfer environment in accordance with one or more embodiments of the present technology.

FIGS. 8A-8D are top views illustrating a processing sequence for the third example transfer environment in accordance with one or more embodiments of the present technology. FIGS. 8A-8D illustrate various states of the robotic system 100 of FIG. 1 and/or the target object 112 during the processing sequence. As illustrated in FIG. 8A, the robotic system 100 can control the source sensor 306 to generate an image data depicting the source container 304 and object(s) therein. Based on the image data, the robotic system 100 can process the image data to identify the target object 112 and derive a motion plan or a portion thereof to pick up, transfer and/or place the target object 112. According to the motion plan, the robotic system 100 can operate the picking robot 302 to pick the target object 112 (by, e.g., gripping with the end-effector and/or lifting). Once the target object 112 reaches a minimum height (e.g., as represented by a triggering event from the area sensors 502), the robotic system 100 can move the transfer tray 506 between the destination container 310 and the source container 304. For example, the robotic system 100 can move the transfer tray 506 from locations that are adjacent to and/or over the destination container 310 to locations adjacent to and/or over the source container 304. The initial state of the stopper 508 can be the disengaged state.

Figure 8B:
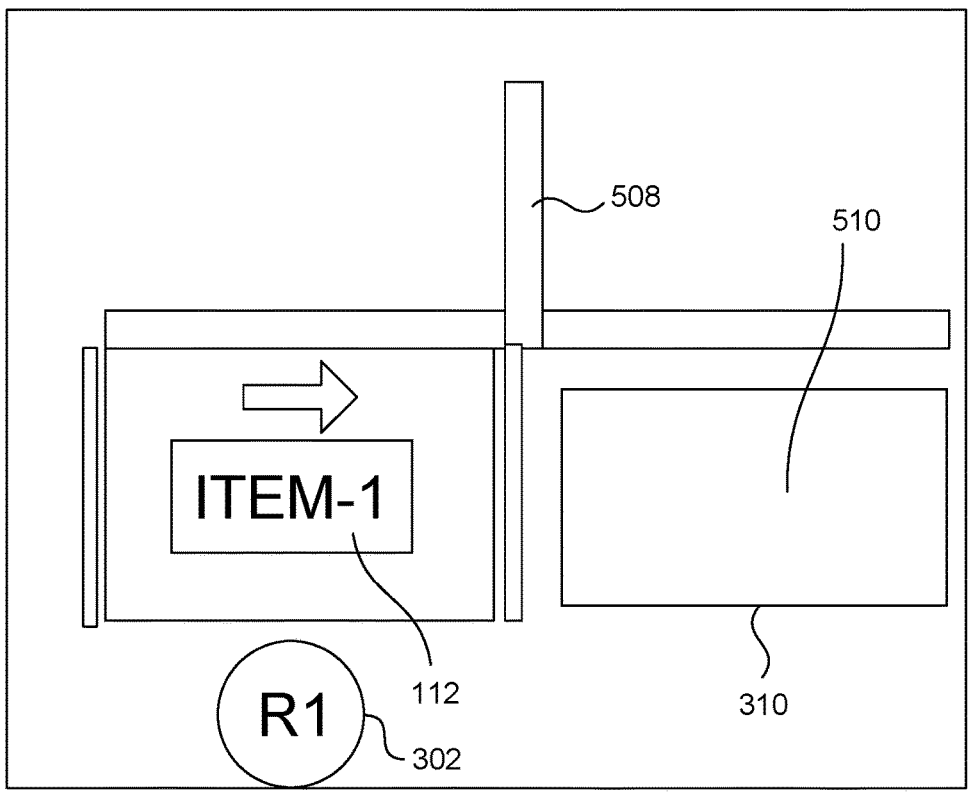

As illustrated in FIG. 8B, the robotic system 100 can control the picking robot 302 to drop and/or place the target object 112 onto the transfer tray 506 below. In some embodiments, the robotic system 100 can adjust a lateral position of the stopper 508 according to a drop location 510 for the target object 112. In other embodiments, the stopper 508 can be located at a fixed/static lateral location. The robotic system 100 can move the transfer tray 506 and the target object 112 thereon toward the destination container 310. In some embodiments, the robotic system 100 can replace the source container 304 at the start location 114 after placing the transfer tray 506 below the target object 112 and/or while the transfer tray 506 moves toward the destination container 310. In other embodiments, the source container 304 can include multiple objects which can be selected as the new target object 402.

Figure 8C:
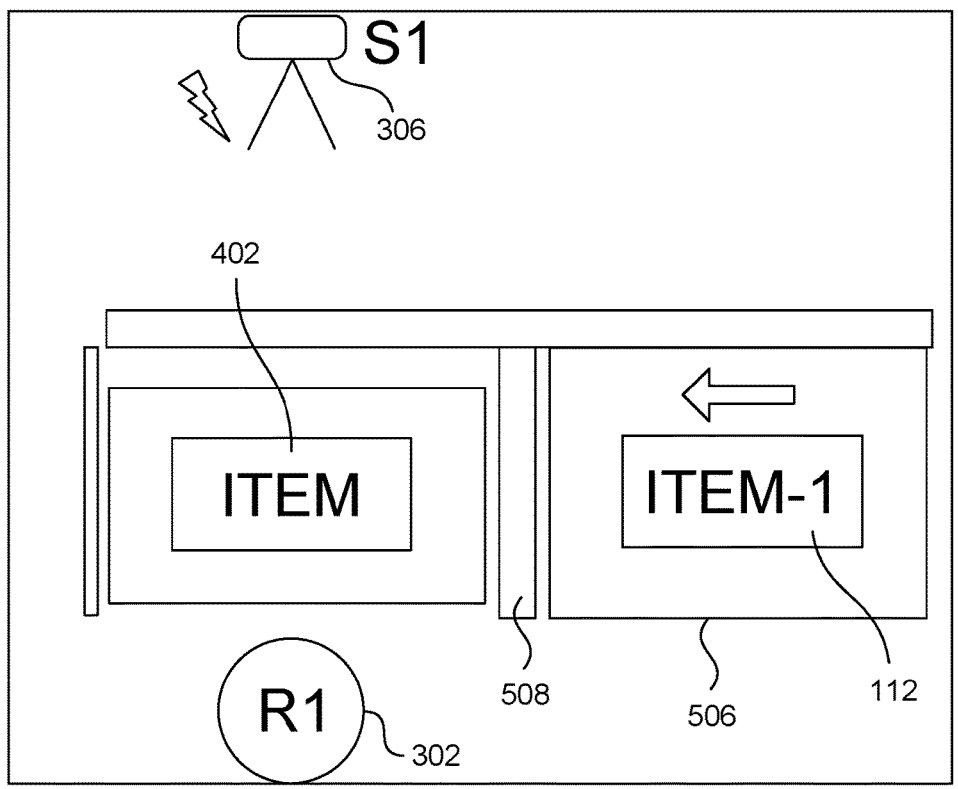

As illustrated in FIG. 8C, the robotic system 100 can move the transfer tray 506 toward and/or over the destination container 310 and past the stopper 508 that is in the disengaged state. Once the transfer tray 506 reaches a predetermined horizontal location relative to or over the destination container 310, the robotic system 100 can operate the stopper 508 to be in the engaged state. Subsequently, the robotic system 100 can move the transfer tray 506 toward the source container 304. Accordingly, the target object 112 can be stopped based on contacting the stopper 508 while the transfer tray 506 continues to move laterally. While the transfer tray 506 is over the destination container 310, the robotic system 100 can generate additional image data for the source container 304, generate the corresponding motion plan, and/or pick the next object 402 from the source container 304.

Figure 8D:
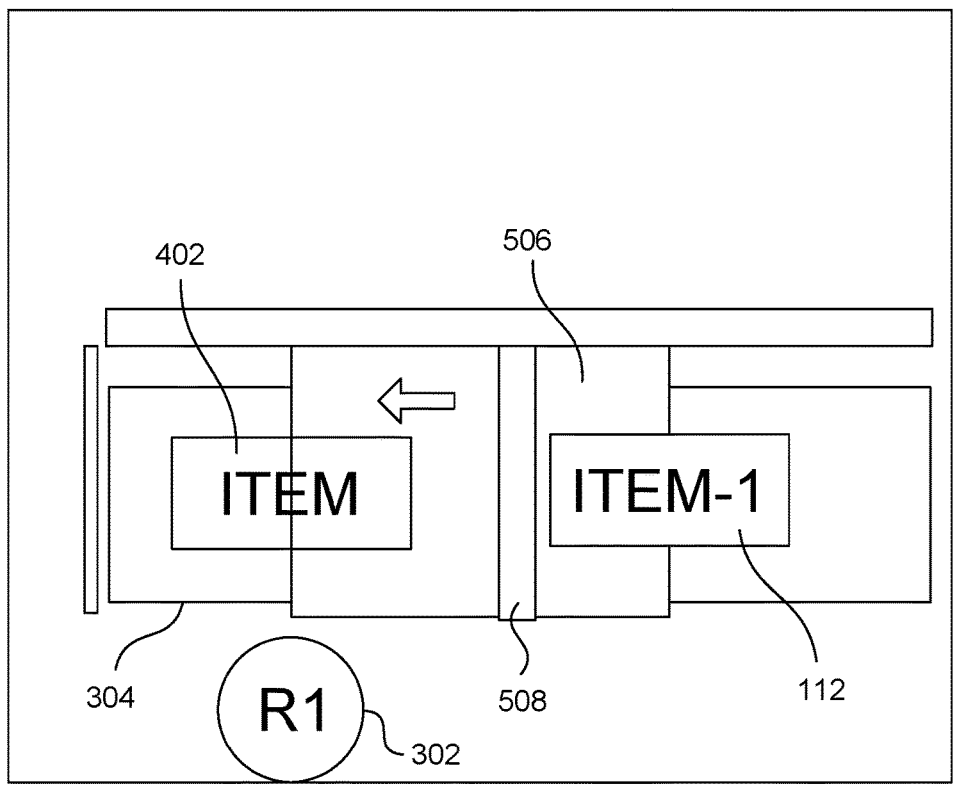

As illustrated in FIG. 8D, the robotic system 100 can continue moving the transfer tray 506 past the stopper 508. As a result, the target object 112 can slide off the transfer tray 506 and drop into the destination container 310. The transfer tray 506 can continue to move until it is over the source container 304, within a threshold distance from the picked target object 112, and/or under the picked target object 112. Further, the robotic system 100 can operate the stopper 508 to be in the disengaged state. Accordingly, the robotic system 100 can return to the state illustrated in FIG. 8B in preparation to place the target object 112 on the transfer tray 506 and begin lateral transfer thereof. The robotic system 100 can repeat the above described states to pack multiple objects into the destination container 310.

Figure 8E:
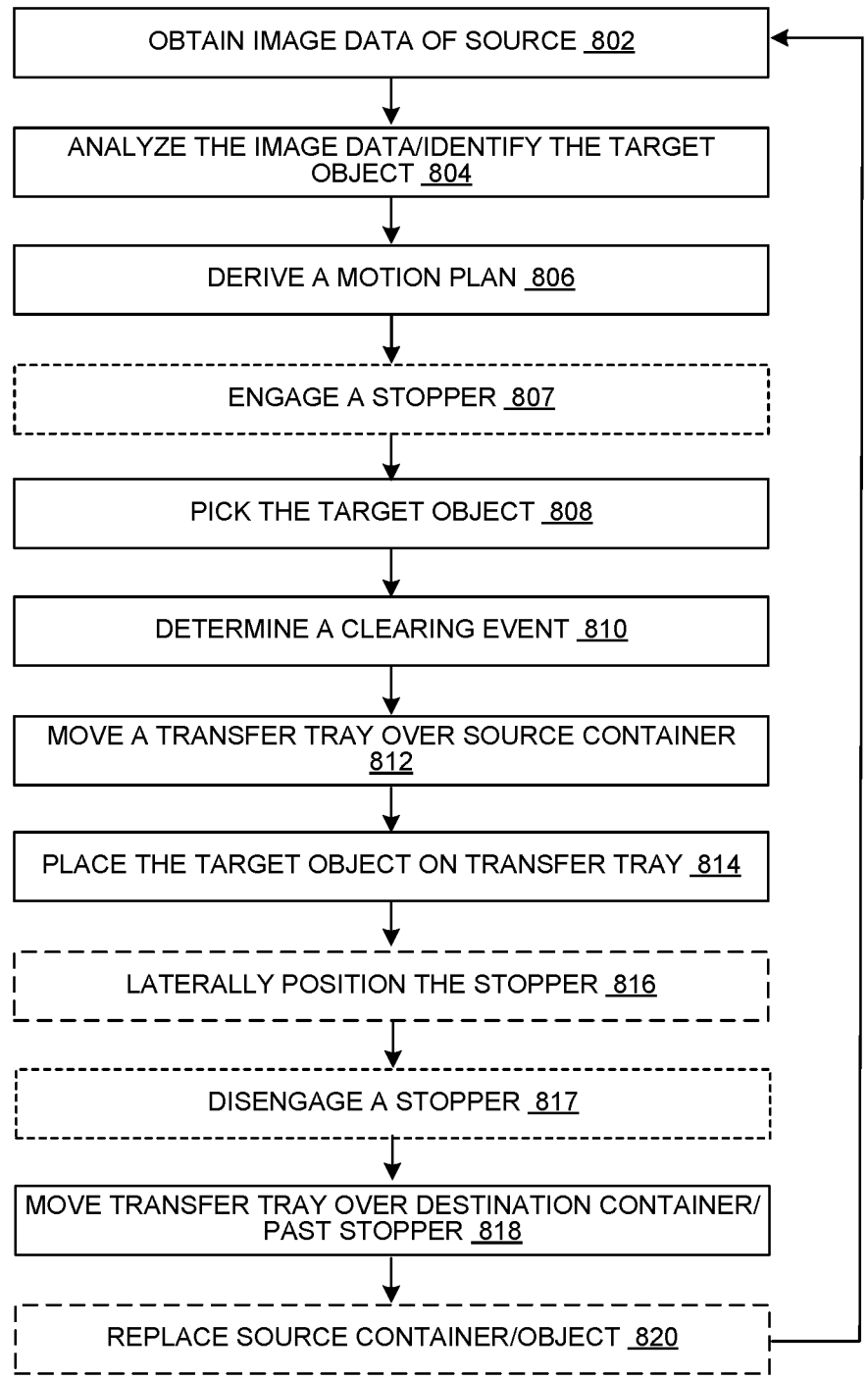
FIG. 8E is a flow diagram of a second example method for operating the robotic system of FIG. 1 in accordance with one or more embodiments of the present disclosure.

FIG. 8E is a flow diagram of a second example method 800 for operating the robotic system 100 of FIG. 1 in accordance with one or more embodiments of the present disclosure. The example flow diagram can represent processes and/or maneuvers executed by one or more units in the third example transfer environment. Accordingly, the second example method 800, or a portion thereof, can correspond to the motion plan for executing a task to transfer the target object 112 from the source container 304 to the destination container 310.

The second example method 800 can be similar to the method illustrated in FIG. 6E. For example, the processes represented by blocks 802, 804, 806, 808, 810, 812, 814, 816, 818, and 820 can be similar to those represented by blocks 602, 604, 606, 608, 610, 612, 614, 616, 618, and 620, respectively.

At block 802, the robotic system 100 can obtain image data depicting the source container 304 of FIG. 5A and the contents therein (e.g., the target object 112 of FIG. 5A) using the source sensor 306 of FIG. 5A. At block 804, the robotic system 100 can analyze the image data to identify, detect, and locate the target object 112 based on analyzing the image data. At block 806, the robotic system 100 can derive a motion plan based on detecting and/or locating the target object 112. As described above, the robotic system 100 can derive the motion plan for operating the picking robot 302 of FIG. 5A, the transfer tray 506 of FIG. 5A, and/or the stopper 508 of FIG. 5A to pick the target object 112, place the target object 112 on the transfer tray 506, and drop the target object 112 into the destination container 310. At block 808, the robotic system 100 can pick the target object 112 via the picking robot 302 based on the derived motion plan (e.g., by communicating the motion plan and/or the associated commands/settings from the processors 202 to the picking robot 302 and executing the motion plan via the picking robot 302).

For the second example method 800, the robotic system 100 can implement the motion plan to operate (e.g., engage and disengage) the stopper 508 to drop the target object 112 into the destination container. For example, as illustrated at block 807, the robotic system 100 can implement the motion plan to engage the stopper 508 (via, e.g., lowering the stopper 508 to a predetermined stopper height above a top surface of the transfer tray 506) after and/or during derivation of the motion plan (block 806). In some embodiments, the robotic system 100 can engage the stopper 508 while picking the target object 112 (block 808).

With the stopper engaged, at block 810, the robotic system 100 can determine a clearing event by tracking a height of the end-effector while implementing the motion plan, such as when the tracked height reaches a height greater than a minimum clearance height plus a known height of the target object 112. The robotic system 100 can also determine the clearing event by detecting an exit event using the area sensors 502. At block 812, using the clearing event as a trigger, the robotic system 100 can implement a portion of the motion plan to move the transfer tray 506 toward and/or over the source container 304 such that the transfer tray 506 is within a threshold distance from and/or directly under the picked target object 112. At block 814, the robotic system 100 can implement a portion of the motion plan to place/drop the target object 112 on the transfer tray 506, such as by operating the picking robot 302 to lower the target object 112 and/or by releasing the target object 112 from the end-effector. In some embodiments, as illustrated at block 816, the robotic system 100 can implement a portion of the motion plan to laterally position the stopper 508, such as by moving the stopper 508 along a horizontal direction/plane and aligning an edge of the stopper over a drop location. Accordingly, the robotic system 100 can drop the target object 112 into the destination container 310 using the stopper 508 of FIG. 7A.

At block 817, the robotic system 100 can disengage the stopper 508, such as by raising the stopper 508 to a predetermined height and increasing a vertical separation from the top surface of the transfer tray 506. The robotic system 100 can disengage the stopper 508 while or after placement of the target object 112 on the transfer tray 506 (block 814) and/or lateral positioning of the stopper 508 (block 816). The robotic system 100 can disengage the stopper 508 prior to moving the transfer tray 506 toward and/or over the destination container 310 (block 818). Accordingly, the transfer tray 506 can carry the target object 112 thereon over or within a threshold distance from the destination container 310. At block 820, in some embodiments, the robotic system 100 may implement a portion of the motion plan to replace the source container 304 and/or reload a new object (e.g., the new target object 402 of FIG. 8C) at the start location 114 for the next task. In other embodiments, the source container 304 can include multiple objects which can be selected as the new target object 402. The operational flow can pass to block 802 and the robotic system 100 can repeat the above-described process to execute the next task for the new object.

As the above described processes repeat, such as for identifying and picking the next object 402, the robotic system 100 can engage the stopper 508 at block 807 and move the transfer tray 506 toward and/or over the source container 304 at block 812 with the target object 112 still on the transfer tray. The target object 112 can contact the stopper 508 and begin sliding off as the transfer tray 506 continues to move toward the source container 304, thus resulting in the target object 112 dropping into the destination container 310. Thus, the robotic system 100 can drop the target object 112 into the destination container 310 as the transfer tray 506 moves back toward the source container 304 to receive the next object 402.

Fourth Example Transfer Environment

Figure 9:
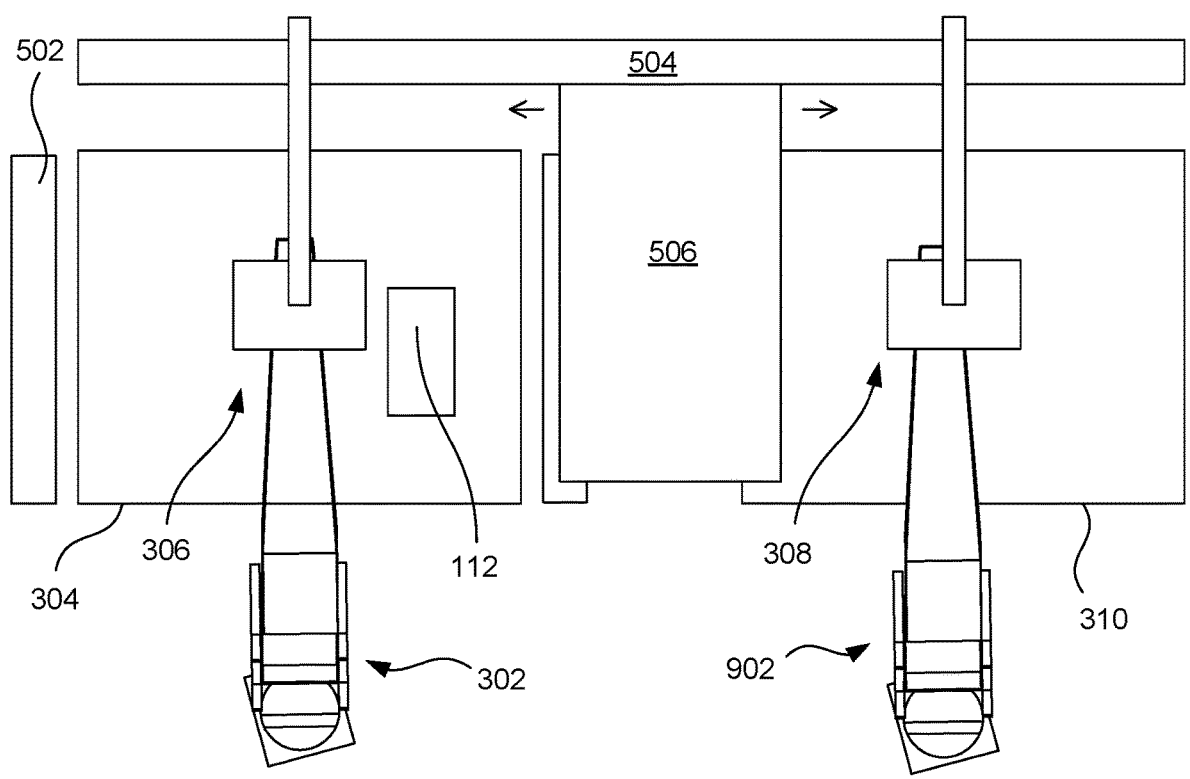
FIG. 9 is a top view illustrating a fourth example transfer environment in accordance with one or more embodiments of the present technology.

FIG. 9 is a top view illustrating a fourth example transfer environment in accordance with one or more embodiments of the present technology. The transfer environment (e.g., a portion of the environment shown in FIG. 1) can be similar to the environment illustrated in FIGS. 5A and/or 7A. For example, the fourth example transfer environment can include a picking robot 302 (e.g., an instance of the transfer unit 104 of FIG. 1), a source sensor 306, a destination sensor 308, a source container 304, a destination container 310, a transfer tray 506, a guiding rail 504, and/or an area sensor 502 as described above. The fourth example transfer environment can be without the stopper 508 illustrated in FIGS. 5A and 7A. For illustrative purposes, FIG. 9 depicts the transfer tray 506 configured to traverse along the guiding rail 504 to be positioned directly over the source container 304 and/or the destination container 310, however, it is understood that the transfer tray 506 and/or the guiding rail 504 can be positioned differently. For example, the transfer tray 506 can be horizontally off-set from the source container 304 and/or the destination container 310 such that transfer tray 506 is positioned above and/or adjacent to, but not directly over, the source container 304 and/or the destination container 310 when traversing along the guiding rail 504. In some embodiments, the guiding rail 504 and the transfer tray 506 can be between the containers (e.g., the source container 304 and the destination container 310) and the robots.

The fourth example transfer environment can include a packing robot 902, which can be similar to the picking robot 302, but configured to place objects into the destination container 310. Instead of dropping objects into the destination container 310 via the stopper 508 as described above, the robotic system 100 can operate the packing robot 902 to pick the objects from the transfer tray 506 and place them into the destination container 310. For example, the robotic system 100 can implement the motion plan to place the transfer tray 506 within a threshold distance from and/or over the destination container 310, pick (e.g., grip and/or lift) the target object 112 thereon via the packing robot 902, transfer/lower the target object 112 to a placement location, and then release the target object 112. Accordingly, using the packing robot 902, the robotic system 100 can increase control over the placement of the target object 112. Thus, the robotic system 100 can reduce damage to the target object 112 and/or increase accuracy in placing/packing the target object 112. Moreover, using the packing robot 902 and the transfer tray 506, the robotic system 100 can reduce and/or eliminate horizontal transfer of the target object 112 via a robotic arm. Accordingly, the robotic system 100 can reduce piece loss caused by grip failure during transfer of the target object 112.

Fourth Example Transfer States

Figure 10A:
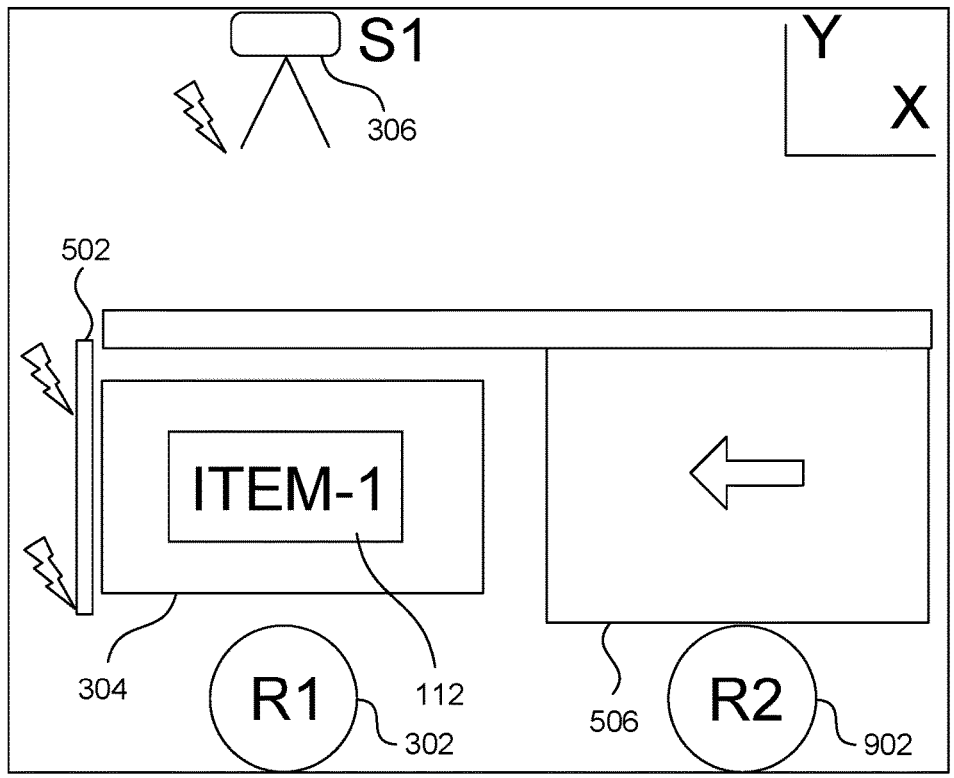
FIGS. 10A-10D are top views illustrating a processing sequence for the fourth example transfer environment in accordance with one or more embodiments of the present technology.

FIGS. 10A-10D are top views illustrating a processing sequence for the fourth example transfer environment in accordance with one or more embodiments of the present technology. FIGS. 10A-10D illustrate various states of the robotic system 100 of FIG. 1 and/or the first target object 112 during the processing sequence. As illustrated in FIG. 10A, the robotic system 100 can control the source sensor 306 to generate an image data depicting the source container 304 and object(s) therein. Based on the image data, the robotic system 100 can process the image data to identify the first target object 112 and derive a motion plan to pick up, transfer and/or place the first target object 112. According to the motion plan, the robotic system 100 can operate the picking robot 302 to pick the first target object 112 (by, e.g., gripping with the end-effector and/or lifting). Once the first target object 112 reaches a minimum height (e.g., as represented by a triggering event from the area sensors 502), the robotic system 100 can move the transfer tray 506 from the destination container 310 to the source container 304 (e.g., between locations adjacent to and/or over the destination container 310 and the source container 304).

Figure 10B:
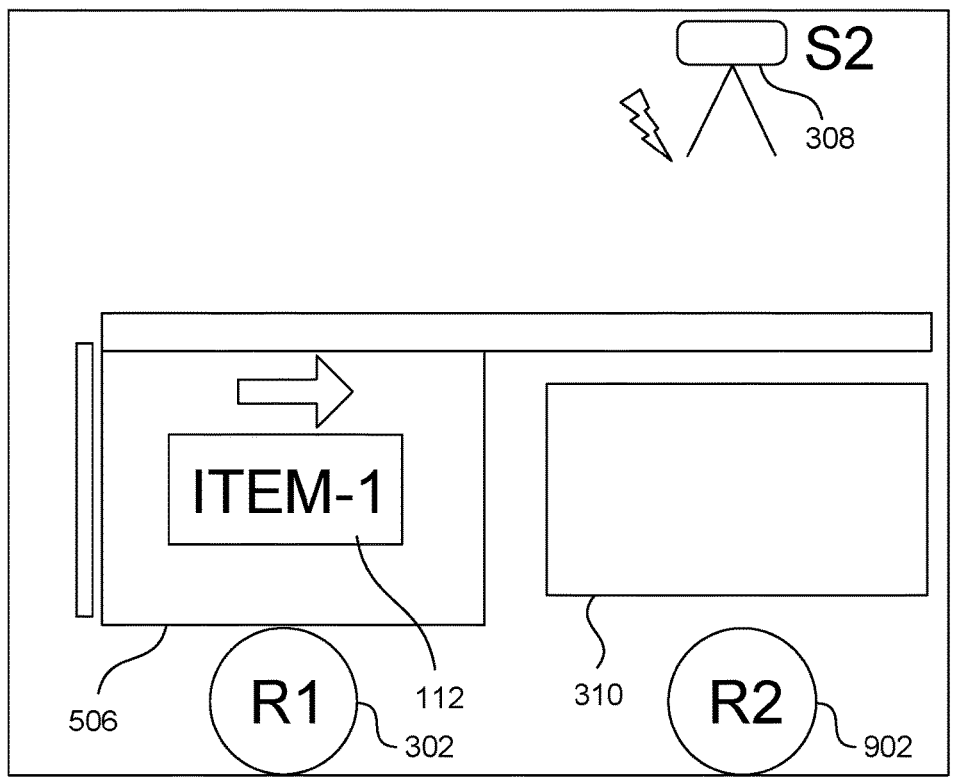

As illustrated in FIG. 10B, the robotic system 100 can control the picking robot 302 to drop and/or place the first target object 112 onto the transfer tray 506 below the first target object 112. With the transfer tray 506 over or within a threshold distance from the source container 304 and the destination container 310 exposed, the robotic system 100 can operate the destination sensor 308 to generate an image data depicting the destination container 310 and/or object(s) therein. Subsequently the robotic system 100 can move the transfer tray 506 and the first target object 112 thereon toward the destination container 310. In some embodiments, the robotic system 100 can replace the source container 304 at the start location 114 after placing the transfer tray 506 below the first target object 112 and/or while the transfer tray 506 moves toward the destination container 310. In other embodiments, the source container 304 can include multiple objects which can be selected as the new target object 402.

Figure 10C:
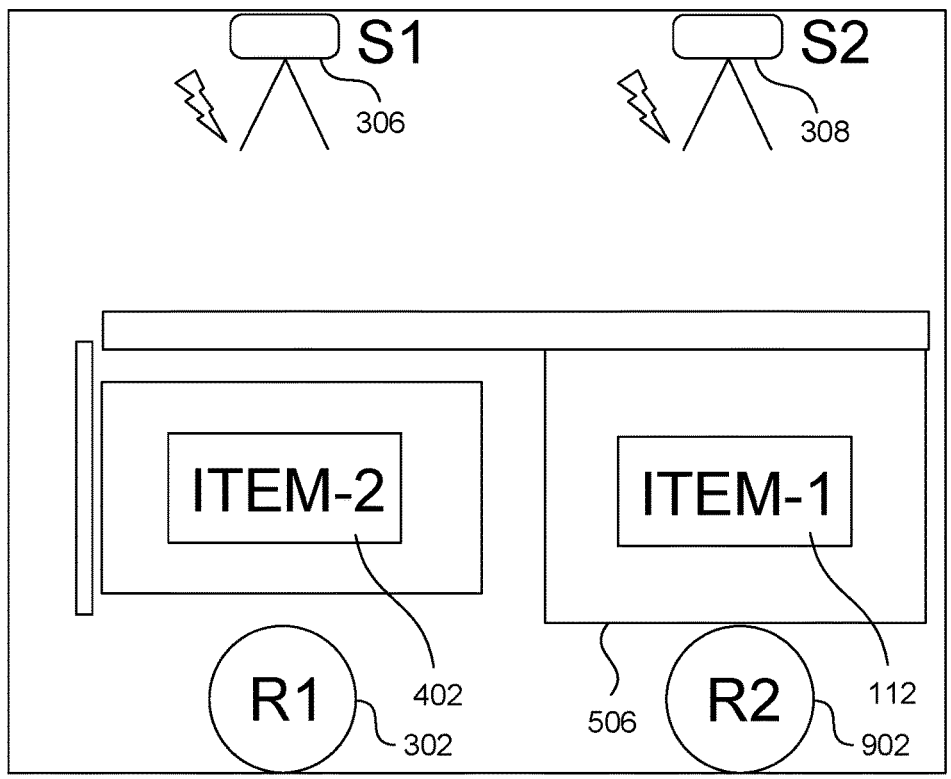

As illustrated in FIG. 10C, the robotic system 100 can move the transfer tray 506 toward and/or over the destination container 310 and within a threshold distance from and/or under the end-effector of the packing robot 902. The robotic system 100 can operate the destination sensor 308 to generate an image data depicting the first target object 112 on the transfer tray 506 and about/over the destination container 310. According to the image data of the destination container 310 (i.e., illustrated in FIG. 10B) and the image data of the first target object 112, the robotic system 100 can derive a portion (e.g., a destination placement portion) of the motion plan for the packing robot 902. The robotic system 100 can implement the motion plan using the packing robot 902 to pick the first target object 112 from the transfer tray 506.

The robotic system 100 can also operate the source sensor 306 to generate an image data to identify a second target object 402 in the source container 304 and/or derive a corresponding portion (e.g., a picking portion) of a motion plan for the picking robot 302. In some embodiments, the robotic system 100 can operate the source sensor 306 and the destination sensor 308 simultaneously. The robotic system 100 can implement the motion plan for the second target object 402, thereby operating the picking robot 302 to pick the second target object 402. In some embodiments, the robotic system 100 can operate the picking robot 302 and the packing robot 902 simultaneously to pick the corresponding objects.

Figure 10D:
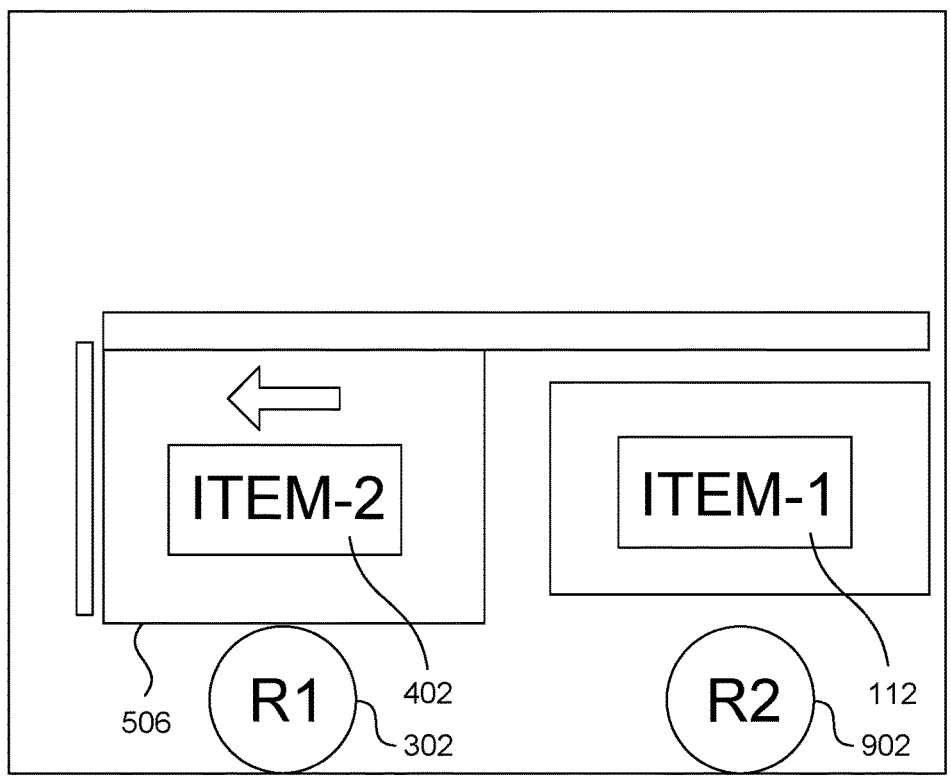

As illustrated in FIG. 10D, the robotic system 100 can move the transfer tray 506 toward and/or over the source container 304. When the transfer tray 506 reaches a predetermined location over or about the source container 304, the picking robot 302 can place the second target object 402 onto the transfer tray 506. The robotic system 100 can operate the packing robot 902 to place the first target object 112 in the destination container 310. In some embodiments, the robotic system 100 can operate the picking robot 302 and the packing robot 902 simultaneously to place the corresponding objects. The robotic system 100 can repeat the states described above to transfer and pack multiple objects. The robotic system 100 can implement a method that corresponds to the above described states.

Figure 10E:
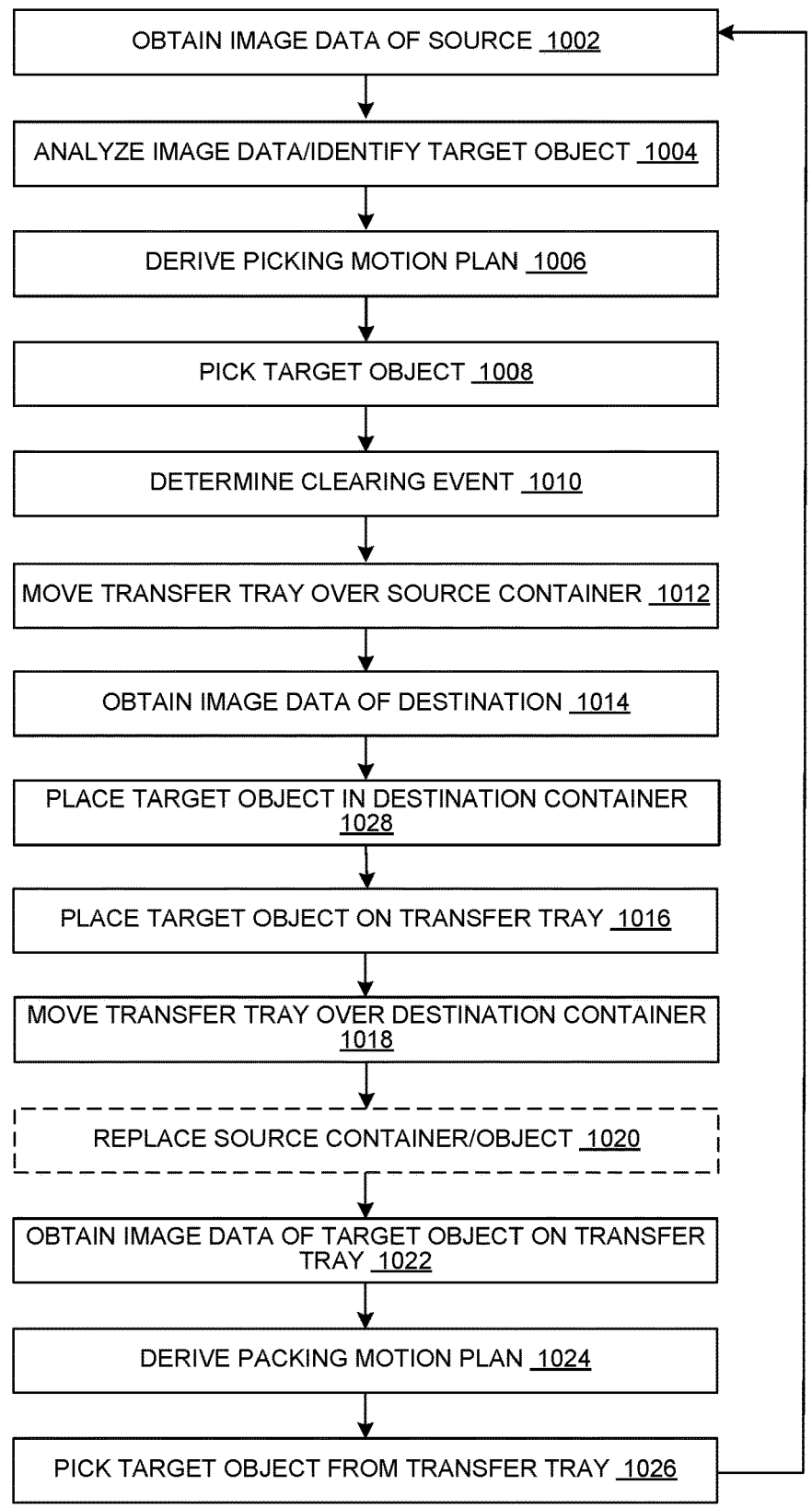
FIG. 10E is a flow diagram of a third example method for operating the robotic system of FIG. 1 in accordance with one or more embodiments of the present disclosure.

FIG. 10E is a flow diagram of a third example method 1000 for operating the robotic system 100 of FIG. 1 in accordance with one or more embodiments of the present disclosure. The example flow diagram can represent processes and/or maneuvers executed by one or more units in the fourth example transfer environment. Accordingly, the third example method 1000, or a portion thereof, can correspond to the motion plan for executing a task to transfer the target object 112 from the source container 304 to the destination container 310.

The third example method 1000 can be similar to the method illustrated in FIGS. 6E and/or 8E. For example, the processes represented by blocks 1002, 1004, 1006, 1008, 1010, 1012, 1016, 1018, and 1020 can be similar to those represented by blocks 602, 604, 606, 608, 610, 612, 614, 618, and 620, respectively. Also, the processes represented by blocks 1002, 1004, 1006, 1008, 1010, 1012, 1016, 1018, and 1020 can be similar to those represented by blocks 802, 804, 806, 808, 810, 812, 814, 818, and 820, respectively.

At block 1002, the robotic system 100 can obtain image data depicting the source container 304 of FIG. 9 and the contents therein (e.g., the target object 112 of FIG. 5A) using the source sensor 306 of FIG. 9. At block 1004, the robotic system 100 can analyze the image data to identify, detect, and locate the target object 112 based on analyzing the image data. At block 1006, the robotic system 100 can derive a picking portion of the motion plan based on detecting and/or locating the target object 112. As described above, the robotic system 100 can derive the picking portion for operating the picking robot 302 of FIG. 9 and/or the transfer tray 506 of FIG. 9 to pick the target object 112 and place the target object 112 on the transfer tray 506. At block 1008, the robotic system 100 can pick the target object 112 via the picking robot 302 based on the picking portion (e.g., by communicating the motion plan and/or the associated commands/settings from the processors 202 to the picking robot 302 and executing the motion plan via the picking robot 302). At block 1010, the robotic system 100 can determine a clearing event by tracking a height of the end-effector while implementing the motion plan and/or by detecting an exit event using the area sensors 502. At block 1012, using the clearing event as a trigger, the robotic system 100 can implement a portion (e.g., a source transfer portion) of the motion plan to move the transfer tray 506 toward and/or over the source container 304 such that the transfer tray 506 is within a threshold distance from and/or directly under the picked target object 112.

For the third example method 1000, at block 1014, the robotic system 100 can obtain image data depicting the destination container 310 via the destination sensor 308. The robotic system 100 can generate the image data when the transfer tray is within a threshold distance and/or over the source container 304. For example, the robotic system 100 can generate 2D/3D images of the task location 116 of FIG. 1 using the destination sensor 308. The image data may be received by the one or more processors 202 of FIG. 2. The robotic system 100 may obtain image data before, while, or after placing the target object on the transfer tray, as illustrated at block 1016. The robotic system 100 can implement a portion of the motion plan to place/drop the target object 112 on the transfer tray 506, such as by operating the picking robot 302 to lower the target object 112 and/or by releasing the target object 112 from the end-effector. At block 1018, the robotic system 100 can implement a portion of the motion plan to move the transfer tray 506 and the target object 112 thereon toward and/or over the destination container 310. At block 1020, the robotic system 100 may implement a portion of the motion plan to replace the source container 304 and/or reload a new object (e.g., the new target object 402 of FIG. 10C) at the start location 114 for the next task. In other embodiments, the source container 304 can include multiple objects which can be selected as the new target object 402.

Additionally, at block 1022, the robotic system 100 can generate image data depicting the target object 112 on the transfer tray 506 and over/within a threshold distance from the task location 116. The robotic system 100 can generate the image data when the transfer tray 506 is over or within a threshold distance from the destination container 310. At block 1024, based on the image data of the destination container 310 and/or the image data of the target object 112, the robotic system 100 can derive a destination placement portion of the motion plan for the packing robot 902. At block 1026, the robotic system 100 can pick the target object 112 from the transfer tray 506 by implementing a portion of the packing motion plan using the packing robot 902. As illustrated at block 1028, the robotic system 100 can place the picked target object 112 in the destination container 310 via the packing robot 902. The robotic system 100 can implement a portion of the packing motion plan to place the target object 112 after moving the transfer tray from the destination container 310 toward the source container (block 1012).

Figure 11A:
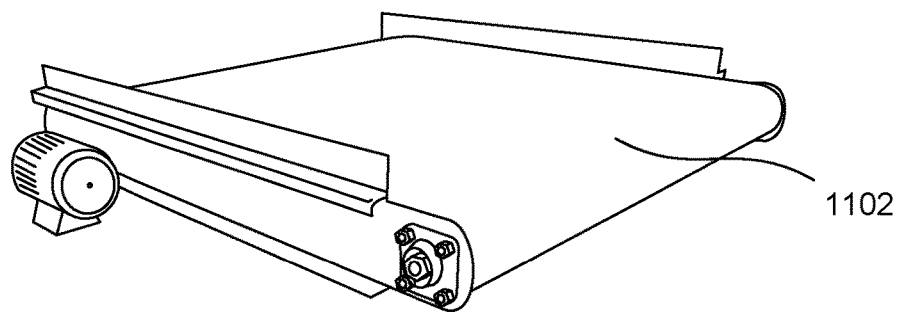
FIGS. 11A-11C are perspective views of example transfer trays in accordance with one or more embodiments of the present disclosure.
Figure 11B:
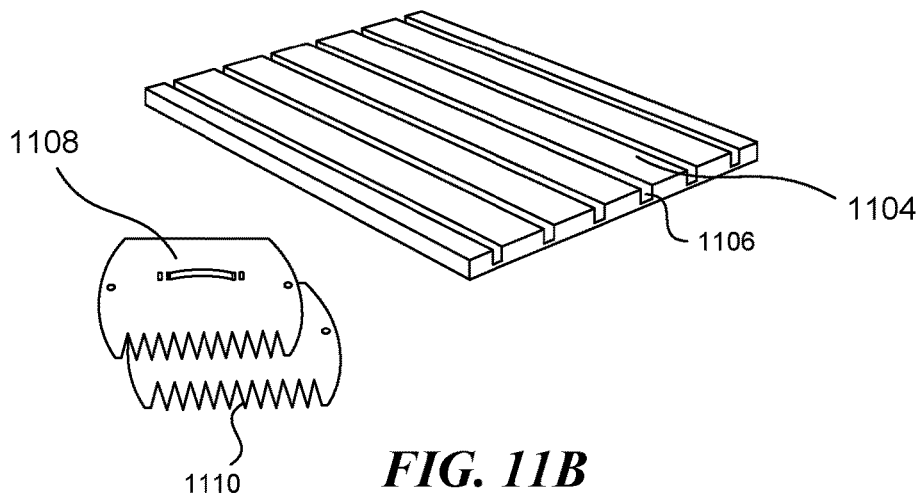
Figure 11C:
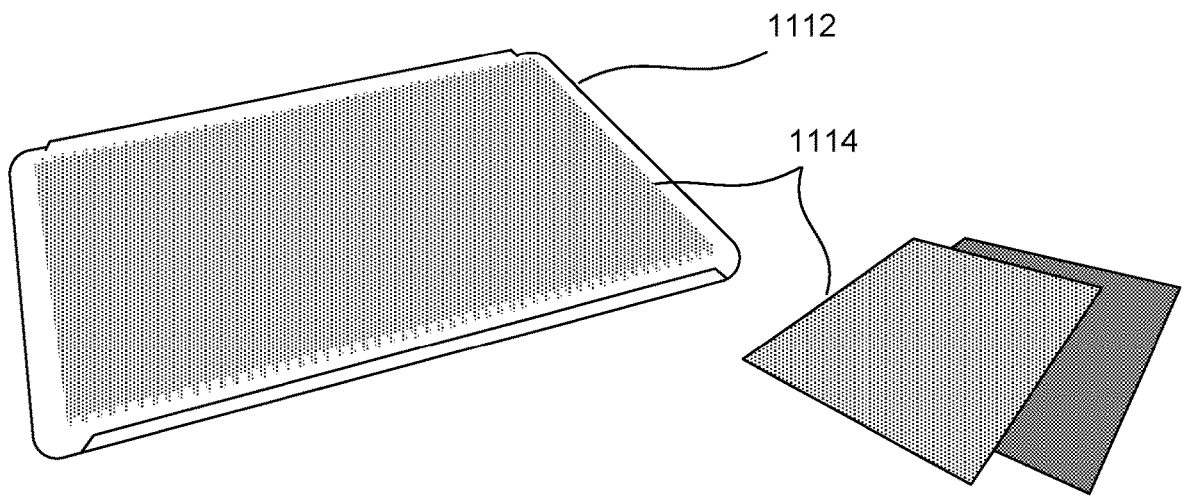

FIGS. 11A-11C are perspective views of example transfer trays (e.g., transfer tray 506 of FIG. 5A) in accordance with one or more embodiments of the present disclosure. FIG. 11A illustrates a belt conveyor transfer tray 1102 configured to laterally transfer objects between locations above the source container 304 and the destination container 310. In some embodiments, the belt conveyor transfer tray 1102 itself can move along the guiding rail 504. Once the belt conveyor transfer tray 1102 reaches a targeted location over and/or within a threshold distance from the destination container 310, the robotic system 100 can operate the belt conveyor to drop the target object 112 instead of using the stopper 508 of FIG. 5A or FIG. 7A to engage the target object 112.

In other embodiments, the belt conveyor transfer tray 1102 can be static and extend between the source container 304 and the destination container 310, and the belt conveyor transfer tray 1102 can move the belt thereon to laterally transfer the target object 112 from the source container 304 and the destination container 310. The belt conveyor transfer tray 1102 can operate without the stopper 508. Moreover, the belt conveyor transfer tray 1102 can horizontally transfer the target object 112 thereon while minimizing stops, change in directions, and/or acceleration events.

FIG. 11B illustrates a slotted transfer tray 1104 configured to laterally transfer objects across the source container 304 and the destination container 310. The slotted transfer tray 1104 can be operably coupled to and move along the guiding rail 504. The slotted transfer tray 1104 can include slots 1106 (e.g., linear depressions) on a top surface thereof. The slots 1106 can extend parallel to the direction of movement of the slotted transfer tray 1104.

In some embodiments, the robotic system 100 can include a fork-style stopper 1108 along with the slotted transfer tray 1104. The fork-style stopper 1106 can include extensions 1110 that extend downward and into the slots 1106. Accordingly, the fork-style stopper 1108 can extend below the target object 112, thereby reducing failures. Further, the slots 1106 can prevent the target object 112 from sticking to the tray 1104, further reducing failures. Also, the slots 1106 can provide an escape path for air while the target object 112 is placed/dropped onto the slotted transfer tray 1104. Accordingly, the slotted transfer tray 1104 can reduce/remove unintended movement of the target object 112, along with the associated failures, caused by air resistance or air flow during placement of the target object.

FIG. 11C illustrates a perforated-surface transfer tray 1112 configured to laterally transfer objects across the source container 304 and the destination container 310. The perforated-surface transfer tray 1112 can include a perforated layer 1114 on the top surface thereof. The perforated layer 1114 can include depressions on the top surface. In some embodiments, the perforated layer 1114 can include rubber or resin type material. Accordingly, the perforated layer 1114 can provide increased friction, thereby reducing the likelihood of the target object 112 slipping off the tray 1112 during transfer. Moreover, the perforated layer 1114 and the depressions in the top surface of the perforated-surface transfer tray 112 can prevent any suction cups on grippers from gripping the tray 1112.

Additionally or alternatively, one or more sensors may be attached to and/or integral with the transfer tray 506. Some examples of the tray sensors can include visual code sensors (e.g., barcode sensor and/or QR sensors), cameras, weight/mass sensor, RFID sensors, contact sensors, etc. In some embodiments, the transfer tray 506 can include an identification sensor (e.g., the RFID sensor or the visual code sensor) that identifies the object placed on the tray. The transfer tray 506 may similarly sense weight/mass object, absence/presence of the object, and/or other aspects of the placed object via the tray sensor(s). The transfer tray 506 can use the sensor output to identify the placed object and/or track the status of the motion plan or the corresponding actions.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A non-transitory computer-readable storage medium storing computer-executable instructions that, when executed by one or more processors, cause one or more computing systems to perform a method for operating a robotic system to transfer an object from a source to a destination, the method comprising:
   accessing image data representative of the source;
   deriving a motion plan based on the image data, wherein the motion plan includes one or more portions for operating (1) a picking robot configured to grip and manipulate the object and (2) a lateral transfer mechanism including a transfer tray located adjacent to the source and the destination and configured to move laterally between the source and the destination;
   implementing a picking portion of the motion plan for operating the picking robot to grip and lift the object from the source;
   detecting a clearing event representative of the object reaching a predetermined height that is above a height of the transfer tray;
   implementing a source transfer portion of the motion plan for operating the lateral transfer mechanism to move the transfer tray toward the source;
   implementing a tray placement portion of the motion plan based on the clearing event and/or a tray location for placing the object on the transfer tray; and
   implementing a destination transfer portion of the motion plan for operating the lateral transfer mechanism to laterally move the transfer tray toward the destination with the object thereon and to move the object from the transfer tray and onto the destination.

2. The non-transitory computer-readable storage medium of claim 1, wherein the method further comprises implementing a stopper placement portion of the motion plan for positioning a stopper such that when the transfer tray moves toward the destination, the stopper contacts the object thereon and causes the object to slide off the transfer tray and drop onto the destination.

3. The non-transitory computer-readable storage medium of claim 1, wherein the method further comprises implementing a stopper placement portion of the motion plan for:
when the transfer tray is over the source, disengaging a stopper to allow the object to pass by the stopper while the transfer tray moves toward the destination; and
when the transfer tray is over the destination, engaging the stopper to contact the object and cause the object to slide off the transfer tray and drop onto the destination.

4. The non-transitory computer-readable storage medium of claim 3, wherein the method further comprises implementing a stopper alignment portion of the motion plan for moving the stopper along a horizontal direction and aligning an edge of the stopper over a drop location.

5. The non-transitory computer-readable storage medium of claim 1, wherein the image data representative of the source is first image data, and wherein the method further comprises:
when the transfer tray is over the source, accessing second image data representative of the destination; and
when the transfer tray is over the destination:
accessing third image data representative of the object on the transfer tray; and
deriving a destination placement portion of the motion plan based on the second and third image data, wherein the destination placement portion is for operating a packing robot.

6. The non-transitory computer-readable storage medium of claim 5, wherein the method further comprises implementing the destination placement portion for operating the packing robot to:
pick the object from the transfer tray when the transfer tray is adjacent to or above the destination; and
place the object onto the destination.

7. The non-transitory computer-readable storage medium of claim 1, wherein the method further comprises implementing a source reloading portion of the motion plan for replacing a container at the source after placing the object on the transfer tray and/or while the transfer tray moves toward the destination.

8. The non-transitory computer-readable storage medium of claim 1, wherein the detection of the clearing event is based on a triggering event from one or more area sensors.

9. The non-transitory computer-readable storage medium of claim 1, wherein the method further comprises:
accessing next image data representative of the source while the transfer tray is adjacent to the destination;
deriving a next motion plan for operating the picking robot and the lateral transfer mechanism based on the next image data while the transfer tray is over the destination; and
implementing a portion of the next motion plan for operating the picking robot to grip and lift a next object from the source while the transfer tray is over the destination.

10. The non-transitory computer-readable storage medium of claim 1, wherein a timing for moving the transfer tray is based on additional image data from a source sensor and/or a tracked height of an end-effector of the picking robot.

11. A method of operating a robotic system to transfer an object from a source to a destination, the method comprising:
accessing image data representative of the source;
deriving a motion plan based on the image data, wherein the motion plan includes one or more portions for operating (1) a picking robot configured to grip and manipulate the object and (2) a lateral transfer mechanism including a transfer tray configured to move laterally between the source and the destination;
implementing a picking portion of the motion plan for operating the picking robot to grip and lift the object from the source;
implementing a source transfer portion of the motion plan for operating the lateral transfer mechanism to move the transfer tray toward the source;
implementing a tray placement portion of the motion plan for placing the object on the transfer tray; and
implementing a destination transfer portion of the motion plan for operating the lateral transfer mechanism to laterally move the transfer tray toward the destination with the object thereon.

12. The method of claim 11, wherein deriving the motion plan includes deriving the picking portion of the motion plan for operating the picking robot to vertically transfer the gripped object without laterally displacing the gripped object.

13. The method of claim 11, wherein:
the motion plan includes one or more portions for operating a stopper configured to engage the object on the transfer tray during lateral movement thereof; and
the method further comprises implementing a stopper placement portion of the motion plan for positioning the stopper to engage the object such that when the transfer tray moves toward or away from the destination, the stopper contacts the object thereon and causes the object to slide off the transfer tray and drop onto the destination.

14. The method of claim 11, wherein the method further comprises:
obtaining second image data representative of the destination;
obtaining third image data representative of the object on the transfer tray;
deriving a destination placement portion of the motion plan based on the second and third image data, wherein the destination placement portion is for operating a packing robot; and
implementing the destination placement portion for operating the packing robot to—
pick the object from the transfer tray when the transfer tray is adjacent to or above the destination; and
place the object onto the destination.

15. An object transfer system comprising:
a picking robot configured to grip and lift an object from a source;
a lateral transfer mechanism configured to laterally transfer a transfer tray and the object thereon from the source to a destination; and
a placement mechanism configured to engage the object and place the object on the destination.

16. The object transfer system of claim 15, wherein:
the transfer tray is above the source and the destination; and the placement mechanism includes a stopper located above the transfer tray and configured to engage the object on the transfer tray during lateral transfer of the object.

17. The object transfer system of claim 16, wherein the transfer tray includes slots extending below a top surface of the transfer tray and along a direction parallel to lateral movement of the transfer tray.

18. The object transfer system of claim 16, wherein the stopper is a fork-style stopper including extensions that extend below the top surface of the transfer tray and into the slots.

19. The object transfer system of claim 16, wherein:
the picking robot includes an end-effector having a set of suction cups configured to contact a top surface of the object, the end-effector configured to create a vacuum condition between the set of suction cups and the top surface of the object for gripping the object; and
the transfer tray is a perforated-surface transfer tray having depressions on a top surface thereof configured to prevent vacuum conditions when a subset in the set of suction cups contact the top surface of the transfer tray.

20. The object transfer system of claim 15, wherein the placement mechanism is a packing robot configured to grip and lift the object from the transfer tray and place the object on the destination.

\* \* \* \* \*